Feb. 2, 1960 A. LIGUORI ET AL 2,923,820

PHASING SYSTEM

Filed Oct. 16, 1956 6 Sheets-Sheet 1

INVENTORS
ANTHONY LIGUORI &
THOMAS R. SHERIDAN
BY Charles H. Brown
ATTORNEY

PHASING SYSTEM

Filed Oct. 16, 1956 6 Sheets-Sheet 2

INVENTORS
ANTHONY LIGUORI &
BY THOMAS R. SHERIDAN
Charles H. Brown
ATTORNEY

INVENTORS
ANTHONY LIGUORI &
THOMAS R. SHERIDAN
BY Charles H. Brown
ATTORNEY

PHASING SYSTEM

Filed Oct. 16, 1956 6 Sheets-Sheet 4

INVENTORS
ANTHONY LIGUORI &
BY THOMAS R. SHERIDAN
Charles H. Brown
ATTORNEY

PHASING SYSTEM

Filed Oct. 16, 1956

INVENTORS
ANTHONY LIGUORI &
THOMAS R. SHERIDAN
BY Charles H. Brown
ATTORNEY

INVENTORS
ANTHONY LIGUORI &
BY THOMAS R. SHERIDAN
Charles H. Brown
ATTORNEY 2,923,820
Patented Feb. 2, 1960

1

2,923,820

PHASING SYSTEM

Anthony Liguori, Huntington Station, and Thomas R. Sheridan, Brooklyn, N.Y., assignors to Radio Corporation of America, a corporation of Delaware Application October 16, 1956, Serial No. 616,346

12 Claims. (Cl. 250—27)

Figure 1:
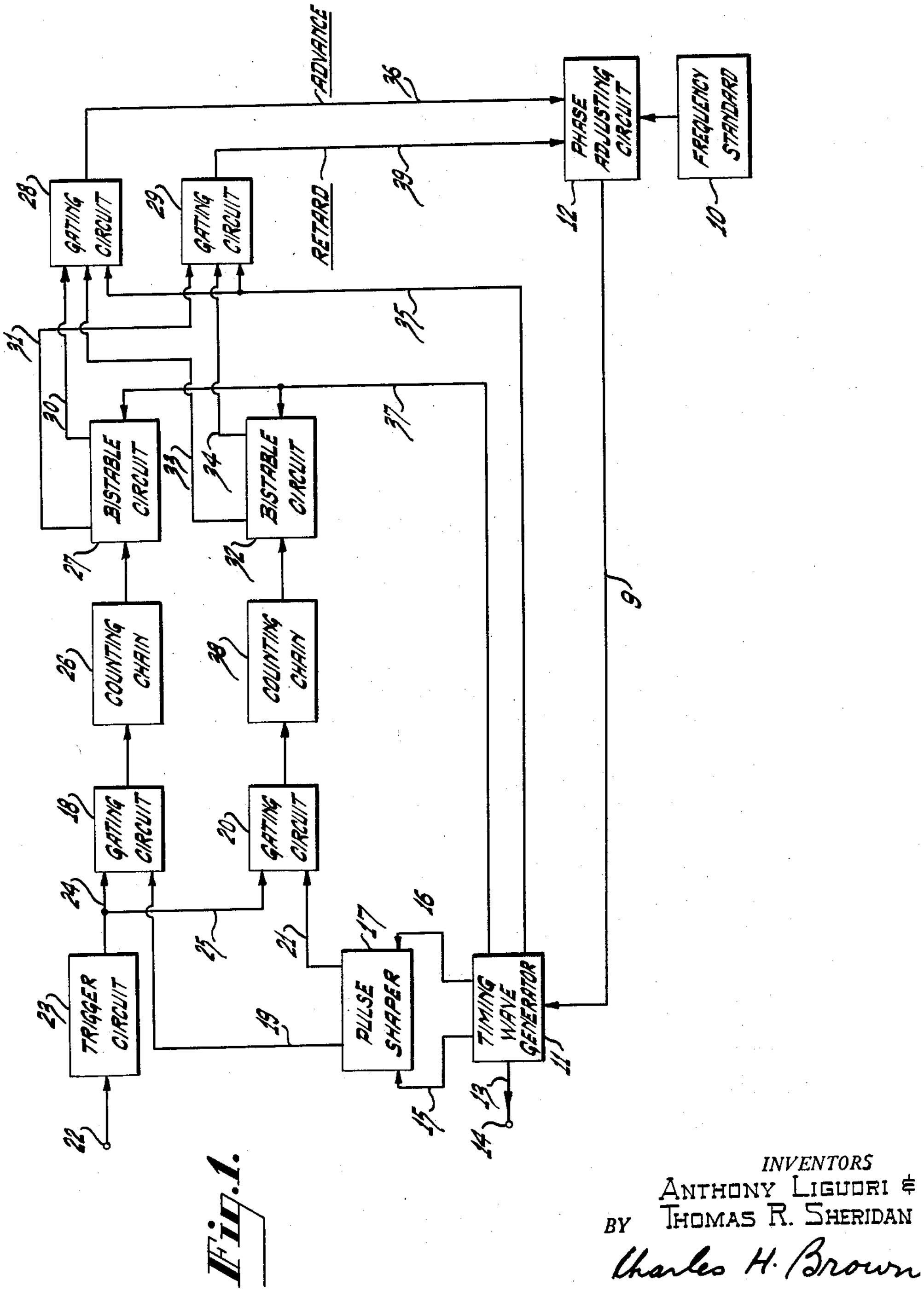
Figure 2A:
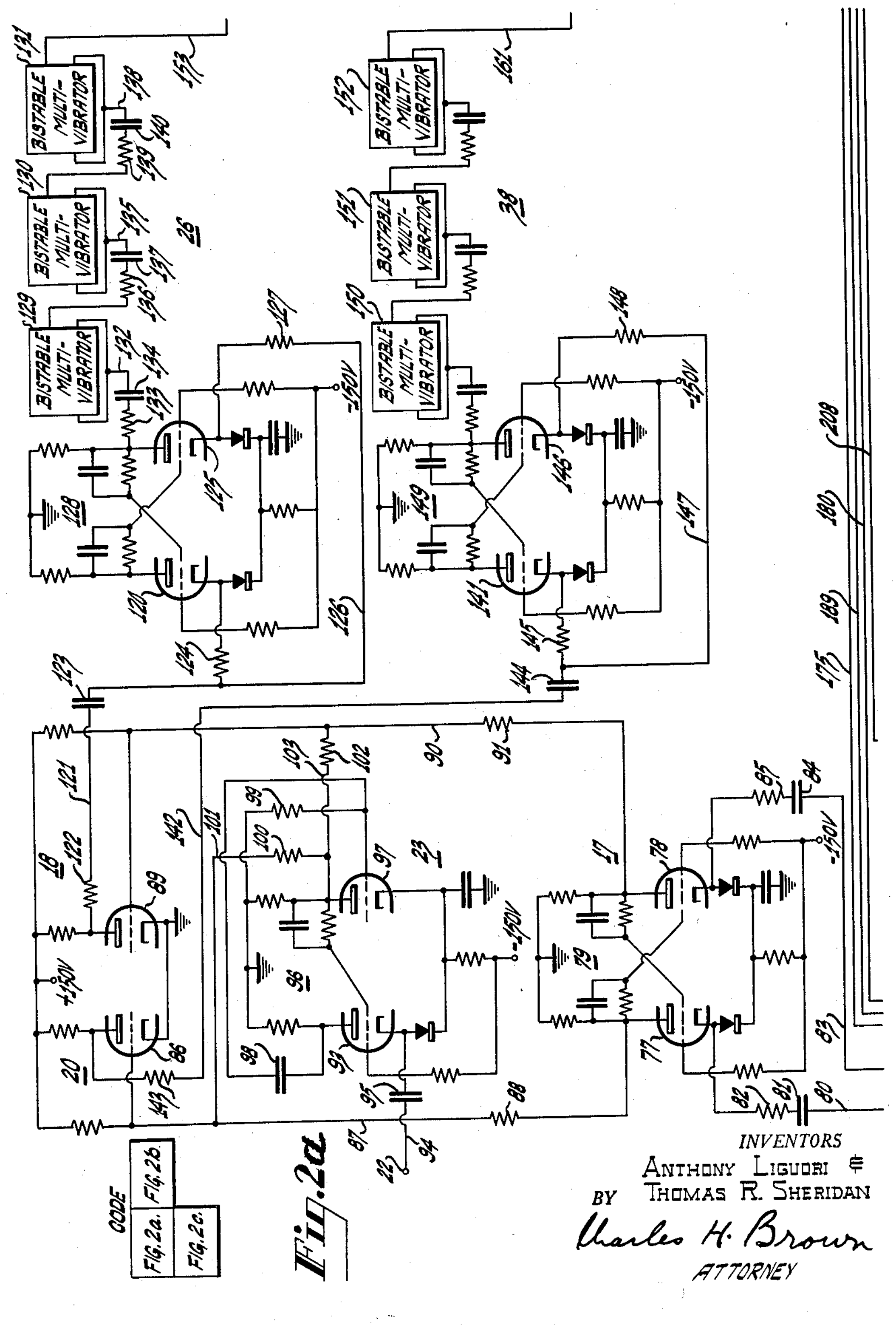
Figure 2B:
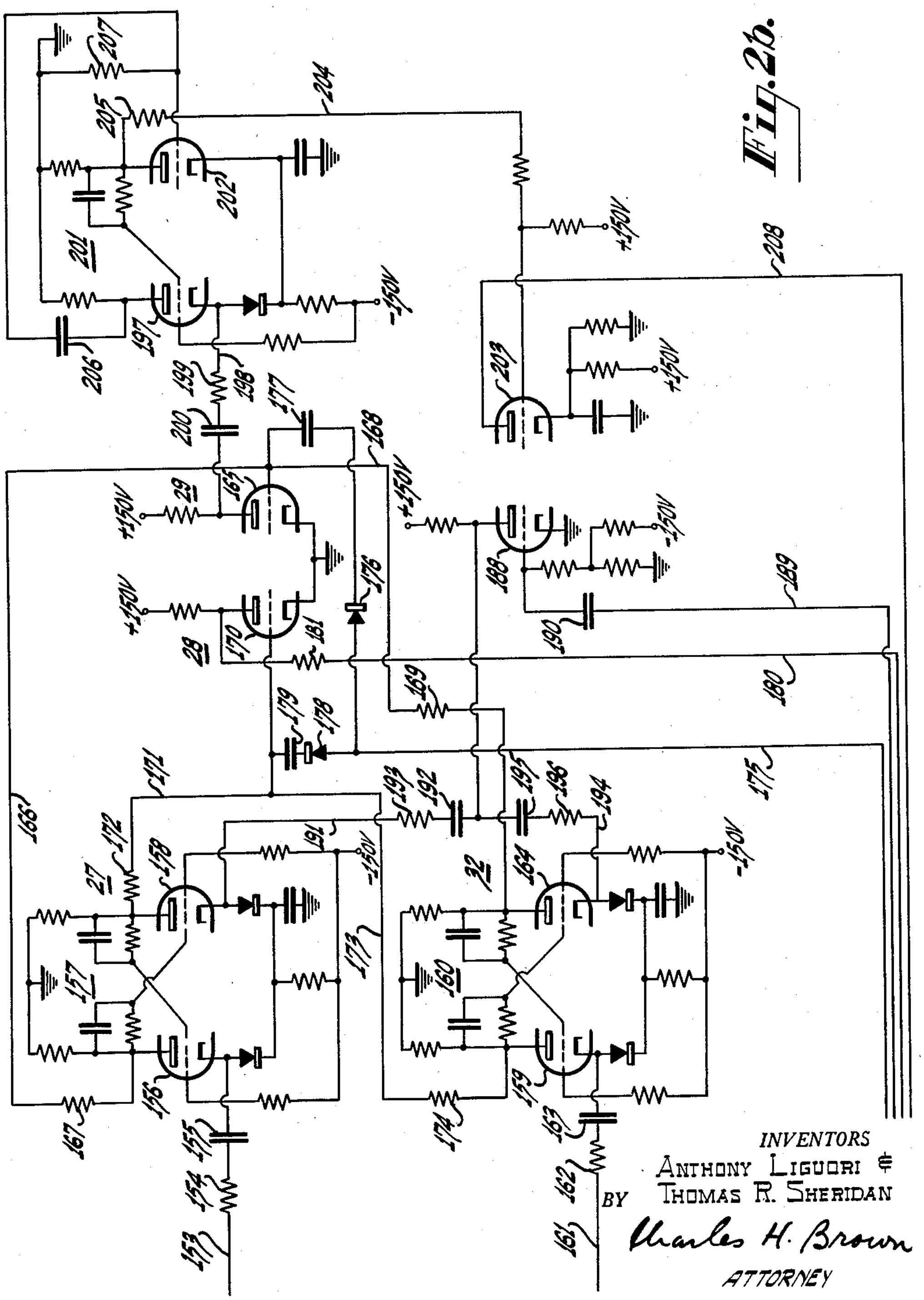
Figure 2C:
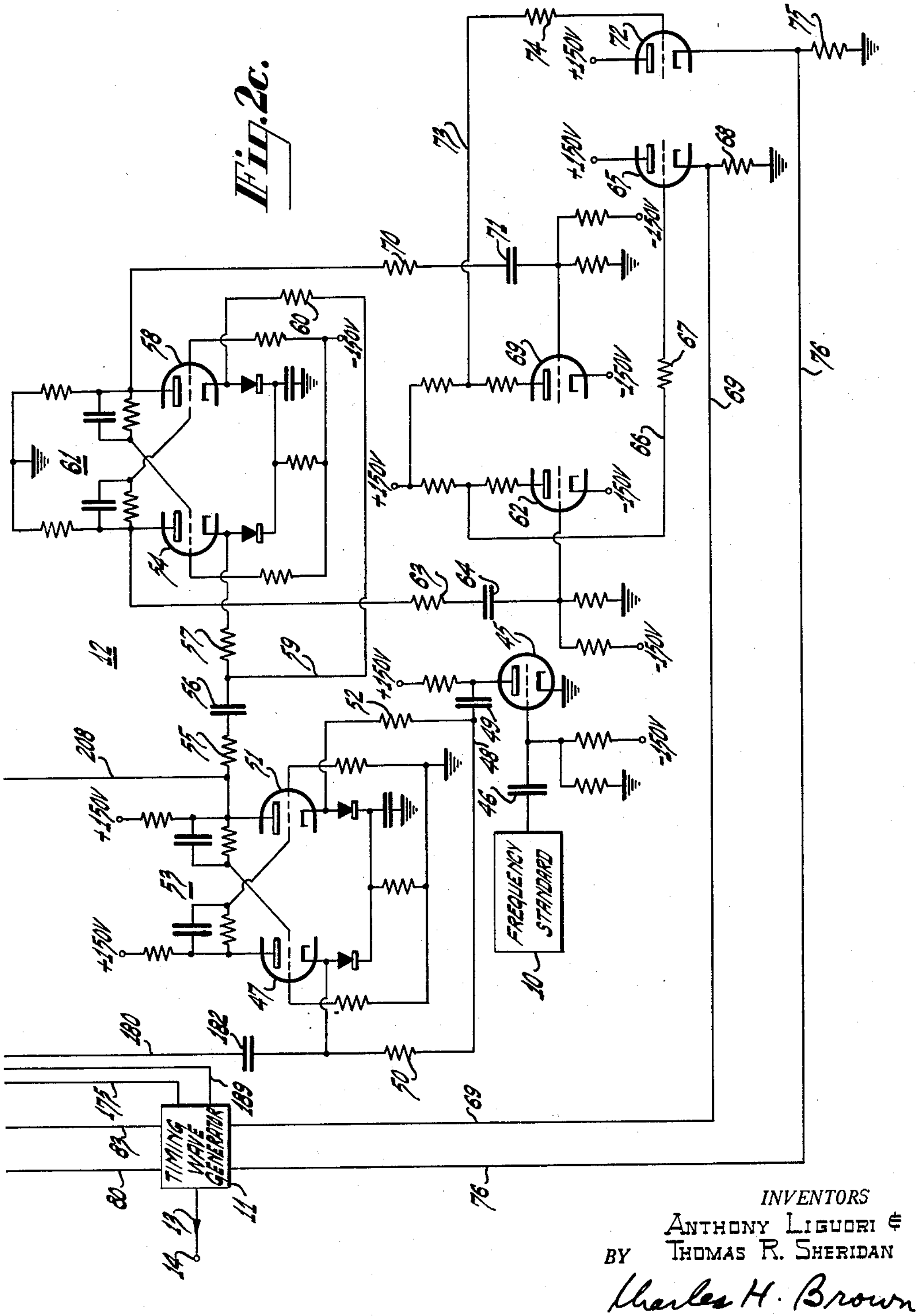

The invention relates to phasing systems. More particularly, the invention relates to a novel system for automatically phasing a timing wave generator used to generate timing waves for local apparatus with an incoming signal.

It is known to use timing wave generators in complex electronic and mechanical systems to generate timing waves to enable apparatus included in the systems to operate in the proper time sequence. For example, a terminal station of a telegraph communication system generally includes at least a receiving unit, a printer and various control units. The control units may function as code converters, extensor circuits and so on. In order to complete the routing of an incoming signal through the receiving unit and control units to the printer, the receiving unit and control units must be made to function in the proper time sequence. The timed functioning of the receiving unit and of the control units is accomplished by providing a timing wave generator which generates timing waves for application to the receiving unit and respective control units in the necessary order. While the use of a timing wave generator in a telegraph communication system has been given by way of example, timing wave generators are used to perform a similar function in other types of data and signal handling systems.

It is essential to the satisfactory operation of such a system including a timing wave generator that a correct phase relationship be established and maintained between the timing waves generated by the timing wave generator and the incoming signal. If an improper phase relationship exists, the apparatus included in the system is not operated in the proper time sequence to correctly handle the incoming signal. The incoming signal will be distorted or garbled. Phase adjusting circuits have been devised which are connected between a source of standard reference waves and the timing wave generator, the timing wave generator being responsive to the reference wave to generate the necessary timing waves for application to utilization circuits. The phase adjusting circuits are operated to shift the phase of the reference wave until the proper phase relationship is established between the timing waves generated by the timing wave generator and the incoming signals, as indicated by suitable indicating means or the observation of clear text on a printing device to which the incoming signal is applied. In the past, such circuits have been operated in response to the manual operation of a control element, usually a simple push button switch. Because the phasing is accomplished by a brute force method, considerable time is apt to be lost in establishing and maintaining the proper phase relationship. Operators must be specially trained to operate the circuits. Electronic methods for achieving the desired phase relation have been suggested but have been found to experience certain difficulties.

It is an object of the invention to provide an improved electronic circuit arrangement for automatically phasing a timing wave generator with an incoming signal.

2

Another object is to provide an improved electronic circuit arrangement for automatically retarding or advancing the phase of a reference wave applied to a timing wave generator such that the proper phase relationship is established and maintained between the timing waves generated by the timing wave generator and an incoming signal.

Briefly, the objects of the invention are accomplished by a circuit arrangement including a timing wave generator arranged to generate timing waves for application to utilization circuits in response to applied pulses obtained from a frequency standard or source of reference waves. The opposite phases of a timing or square wave generated by the timing wave generator are individually applied to a pair of phase detector circuits each including, for example, an electron discharge device, such as a vacuum tube. A train of control pulses derived from an incoming signal is simultaneously applied to both of the phase detector tubes. The phase detector tubes are each arranged to operate as a gating device and are normally biased beyond cut-off such that the tubes remain non-conducting or cut-off regardless of the polarity of the timing waves applied thereto.

When a control pulse is applied to the respective tubes, part or all of the control pulse will be coincident with a positive half-cycle of the timing wave applied to one of the phase detector tubes. When this condition occurs, the sum of the voltages of the control pulse and the positive half-cycle of the timing wave is sufficient to overcome the bias on the tube. The tube will conduct so long as the above coincidence lasts. If the control pulses are entirely coincident with the positive half-cycles of the timing waves applied to one of the phase detector tubes, the phase of the timing waves generated by the timing wave generator is retarded with respect to the desired phase relationship. If the control pulses are entirely coincident with the positive half-cycles of the timing waves applied to the other phase detector tube, the phase of the timing wave is advanced with respect to the desired phase relationship. When parts of the control pulses are simultaneously coincident with the positive half-cycles of both timing waves applied to the different phase detector tubes, the proper phase relationship is established between the timing waves generated by the timing wave generator and the incoming signal.

The existence of a condition in which the phase of the timing wave is retarded or advanced results in the operation of one or the other of the respective phase detector tubes. Current pulses appear in the plate circuits of the tubes according to the occurrence of the different conditions. The current pulses produced by the operation of the phase detector tubes are fed to counting chains, a different counting chain being individually connected to the plate circuit of each of the phase detector tubes. The counting chains each include, for example, a number of series connected frequency dividing or binary circuits arranged in a known manner. The same number of such circuits are included in each of the counting chains. Therefore, one of the counting chains will, in effect, count each current pulse resulting from the occurrence of the condition in which the phase of the timing wave is retarded with respect to the desired relationship, while the second counting chain will count each current pulse resulting from the occurrence of the condition in which the phase of the timing wave is advanced with respect to the desired relationship.

A pair of bistable circuits are individually connected to the counting chains. A bistable circuit sometimes known as a "locking" circuit is defined as a circuit capable of operation in either one of two stable states. Two triggering pulses are required to switch the circuit from one stable state to the second stable state and return. The bistable circuits are each arranged to operate in a first stable state in the absence of a trigger pulse applied thereto from one of the counting chains. A pair of gating circuits are each connected to both of the bistable circuits, each of the gating circuits including, for example, an electron discharge device, such as a vacuum tube, which is biased beyond cut-off. The interconnections between the bistable circuits and each of the gating circuits are made in such a manner that, when the bistable circuits are both operating in the same or corresponding stable states, a cancellation occurs of the voltages applied by the bistable circuits to the respective gating circuits. In this event, because the voltages applied to the gating circuits are not of a sufficient level to overcome the biased condition of the gating tubes, both of the gating tubes remain cut-off or non-conducting. In the absence of a trigger pulse applied to a bistable circuit solely from one of the counting chains, therefore, both of the gating circuits remain cut-off.

When a predetermined number of current pulses occurring as a result of the condition in which the phase of the timing wave is retarded with respect to the desired phase relationship with the incoming signal are counted by one of the counting chains, a trigger pulse is applied from the counting chain to the particular one of the bistable circuits connected thereto. The bistable circuit is triggered to its second stable state, the other bistable circuit continuing to operate in the first stable stage thereof. The voltage applied to one of the gating circuits is raised to a sufficient level to cause that gating circuit to become quasi-permissive but not conductive at this time. An inspection pulse is applied from the timing wave generator to both of the gating circuits at regular intervals. When the next inspection pulse following the triggering of the bistable circuit is applied to the gating circuits, the gating circuit previously made quasi-permissive then conducts. The gating circuit will only conduct in response to the inspection pulse when it has previously been made quasi-permissive by the operation of one of the bistable circuits. The other gating circuit is not made permissive and will not therefore conduct in response to the inspection pulse. A control pulse is produced by the operation of the gating circuit and is applied to a phase adjusting circuit connected between the frequency standard and the timing wave generator. The phase adjusting circuit is responsive to the control pulse produced by the operation of the gating circuit to advance the phase of the reference wave applied to the timing wave generator from the frequency standard, since the timing wave generated by the timing wave generator is indicated as being retarded with respect to the desired phase relationship. The phase adjusting circuit functions to add a transition to the reference wave. In this manner, the timing wave generated by the timing wave generator is advanced in phase until the proper phase relationship is established between the timing wave and the train of control pulses (resulting from the incoming signals) applied to the phase detector circuits. A reset pulse is applied from the timing wave generator to both of the bistable circuits following the application of each inspection pulse to the gating circuits. The bistable circuit previously triggered to its second stable state is returned to its first stable state, and the bistable circuit is readied for a subsequent operation in the manner described.

The operation of the phasing system when the timing wave applied to the phase detector circuits is indicated as advanced with respect to the desired phase relationship is similar to that which occurs when the timing wave is indicated as retarded with respect to the desired phase relationship. When the predetermined number of current pulses resulting from the occurrence of the condition in which the timing wave is advanced with respect to the desired phase relationship are counted by the second counting chain, a trigger pulse is applied from the counting chain to the respective bistable circuit connected thereto. The bistable circuit is triggered to its second stable state, and the second one of the gating circuits is made quasi-permissive. When the next inspection pulse is applied to the gating circuits from the timing wave generator, the second gating circuit conducts. As the other or advance gating circuit is not permissive, it remains cut-off and does not conduct in response to the inspection pulse. A control pulse is applied from the second gating circuit to the phase adjusting circuit. The phase adjusting circuit is responsive to the control pulse from the second gating circuit to retard the phase of the reference wave applied to the timing wave generator, since the timing wave applied to the phase detector tubes is indicated as advanced in phase with respect to the desired phase relationship. The phase adjusting circuit now functions to subtract a transition from the reference wave. The timing wave generated by the timing wave generator is retarded in phase until the proper phase relationship is established.

When the proper phase relationship is established between the timing wave generated by the timing wave generator and the train of control pulses derived from the incoming signals and applied to the phase detector circuits, current pulses are applied from both of the phase detector circuits to the respective counting chains connected thereto. The counting chains will both complete the count of the predetermined number of current pulses at substantially the same time. Both of the bistable circuits are triggered such that they are each made to operate in their respective second stable states. As pointed out above, when the respective bistable circuits are operated in corresponding stable states, a cancellation occurs of the voltages applied to the gating circuits from the bistable circuits. As a result, neither one of the gating circuits is made quasi-permissive. Both of the gating circuits remain cut-off upon the application of the inspection pulse thereto from the timing wave generator. The bistable circuits are both reset to operate in their respective first stable states by the reset pulse applied thereto following the application of the inspection pulse to the gating circuits. As a control pulse from either gating circuit is not applied to the phase adjusting circuit at this time, phase correction does not take place. The reference wave applied to the timing wave generator is neither advanced nor retarded in phase. The timing wave generator continues to operate in response to the reference wave supplied by the frequency standard to generate the timing wave for application to the phase detector circuits and to generate additional timing waves for application to other utilization circuits.

Figure 3:
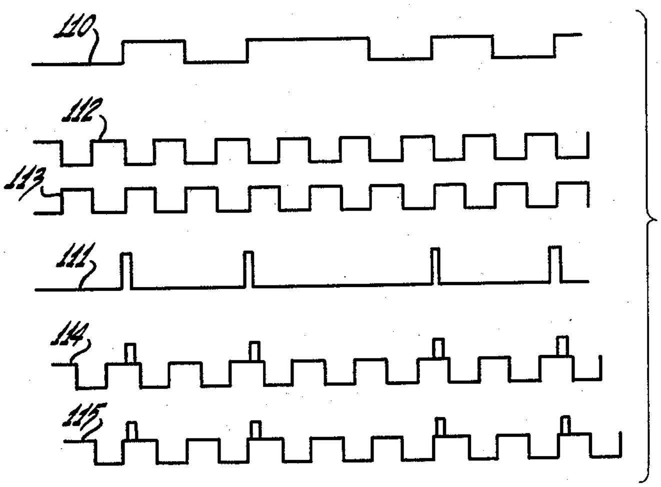
Figure 4:
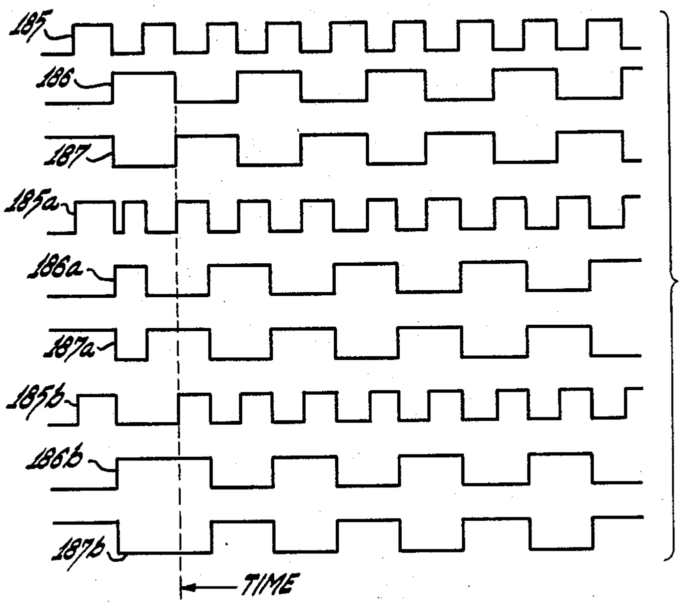
Figure 5:
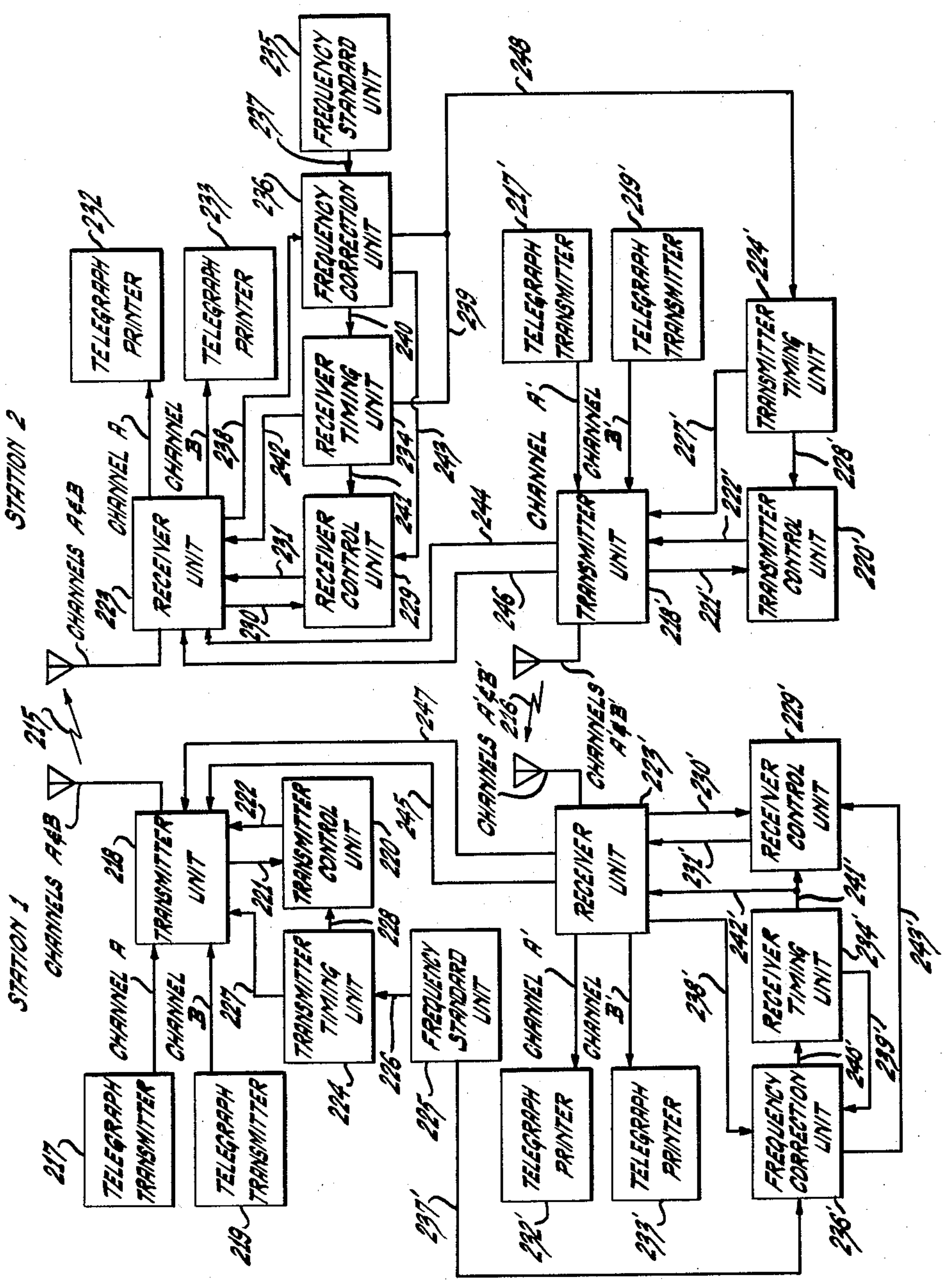

A more detailed description of the invention will now be given in connection with the accompanying drawing, in which:

Fig. 1 is a block diagram of a phasing system constructed according to the invention;

Fig. 2, Figs. 2*a*, 2*b* and 2*c* taken together, is a circuit diagram of one embodiment of a phasing system functioning according to the invention as outlined in the block diagram given in Fig. 1;

Figs. 3 and 4 are a series of waveforms used in explaining the operation of the circuit diagram shown in Fig. 2; and Fig. 5 is a functional block diagram of a telegraph communication system in which the phasing system of the invention may find application.

Referring to the block diagram given in Figure 1, a frequency standard 10 is operated to supply a reference wave of predetermined frequency to a timing wave generator 11 over an electrical path including a lead 9 and phase adjusting circuit 12. The timing wave generator 11 functions in response to the reference wave to generate timing waves which are applied over separate leads represented by lead 13 to different output terminals represented by terminal 14 for application to utilization circuits. Opposite phases of a timing wave generated by the timing wave generator 11 are applied individually over separate leads 15, 16 to a pulse shaper 17. The pulse shaper 17 operates to square the pulses included in the timing wave. One phase of the timing wave is applied from the pulse shaper 17 to a gating circuit 18 over a lead 19, while the other phase of the timing wave is applied from the pulse shaper 17 to a second gating circuit 20 over a lead 21.

A train of control pulses derived from an incoming signal by the operation of a suitable receiving device is applied to an input terminal 22. The train of control pulses is applied from the terminal 22 to a trigger circuit 23. The trigger circuit 23 functions to broaden each of the control pulses included in the train by an amount determined by the time constant of the trigger circuit 23. The train of control pulses is, thereafter, applied from the trigger circuit 23 to both of the gating circuits 18, 20 over leads 24, 25. The gating circuits 18, 20 are each biased such that both of the gating circuits 18, 20 remain blocked or cut-off regardless of the polarity of the timing waves applied thereto. When a control pulse included in the train is applied to the gating circuits 18, 20, part or all of the control pulse will be coincident with a positive half-cycle of the timing wave applied to one of the gating circuits 18 or 20. When this condition occurs, the voltage of the control pulse plus the voltage of the positive half-cycle of the timing wave are sufficient to overcome the biased condition of that gating circuit. The particular gating circuit conducts, and a current pulse is applied from the gating circuit to subsequent circuits to be described.

If the timing wave applied to the gating circuits 18, 20 is retarded in phase with respect to the train of control pulses also applied to the gating circuits 18, 20, the control pulses will be entirely coincident with the positive half cycles of the timing wave applied to the gating circuit 18. The gating circuit 18 conducts, and a current pulse is applied from the gating circuit 18 to a counting chain 26 which is connected thereto. It will be remembered that opposite phases of a timing wave are individually applied from the timing wave generator 11 to the respective gating circuits 18, 20. The control pulses will, therefore, be entirely coincident with the negative half-cycles of the timing wave applied to the other gating circuit 20, and the gating circuit 20 will remain cut-off or non-conducting. The counting chain 26 is arranged to count a predetermined number of current pulses applied thereto from the gating circuit 18, and is connected to a bistable circuit 27. When the predetermined number of current pulses resulting from the condition in which the timing wave applied to the gating circuit 18 is retarded in phase with respect to the desired relationship have been counted by the counting chain 26, the counting chain 26 functions to apply a trigger pulse to the bistable circuit 27.

A pair of gating circuits 28, 29 are each connected to the bistable circuit 27 over leads 30, 31, respectively. In addition, each of the gating circuits 28, 29 is connected to a second bistable circuit 32 over leads 33, 34, respectively. The gating circuits 28, 29 are each biased such that they are both normally blocked or cut-off. The bistable circuits 27, 32 are both arranged to normally operate in a particular or first stable state, the operation of one of the bistable circuits corresponding to that of the other. The gating circuit 28 is connected to the bistable circuits 27, 32 over leads 30, 33, respectively, in such a manner that, when both of the bistable circuits 27, 32 are in their respective first stable states, the voltages applied to the gating circuit 28 from the bistable circuits 27, 32 over leads 30, 33, respectively, cancel one another. The gating circuit 28 remains blocked and non-conducting. In a similar manner, when both of the bistable circuits 27, 32 are in their respective first stable states, the voltages applied from the bistable circuits 27, 32 to the second gating circuit 29 over leads 31, 34, respectively, also cancel one another. The second gating circuit 29 remains blocked and non-conducting.

When the trigger pulse is applied from the counting chain 26 to the bistable circuit 27 in the manner described, the bistable circuit 27 is triggered into its second stable state. This action causes the voltage applied to the gating circuit 28 from the bistable circuit 27 over lead 30 to be of the same polarity as the voltage applied to the gating circuit 28 from the other bistable circuit 32 over lead 33, and a voltage of proper polarity and of sufficient level to cause the gating circuit 28 to become quasi-permissive is applied thereto. Voltages of the opposite polarity are applied to the second gating circuit 29 from the bistable circuits 27, 32 over leads 31, 34, respectively, such that the gating circuit 29 remains blocked or non-permissive. An inspection pulse is applied at regular intervals from the timing wave generator 11 to both of the gating circuits 28, 29 over lead 35. The gating circuit 28 made quasi-permissive by the operation of the bistable circuit 27 conducts. The gating circuit 28 is such that it only conducts in response to the voltage applied thereto upon the operation of the bistable circuit 27 plus the inspection pulse and the continued operation of the bistable circuit 32 in the opposite state. When the gating circuit 28 conducts, a control pulse is applied from the gating circuit 28 to the phase adjusting circuit 12 over lead 36. The phase adjusting circuit 12 functions in response to the control pulse to advance the reference wave applied to the timing wave generator 11 in phase, since the timing wave applied to the gating circuits 18, 20 is indicated as being retarded with respect to the desired relationship.

Immediately following the application of each inspection pulse to the gating circuits 28, 29, a reset pulse is applied from the timing wave generator 11 to the bistable circuits 27, 32 over lead 37. Both of the bistable circuits 27, 32 are triggered by the reset pulse into their respective first stable states. As the bistable circuit 27 is at this time operating in its second stable state in response to the trigger pulse applied thereto from the counting chain 26, the bistable circuit 27 is reset to its first stable state. As both of the bistable circuits 27, 32 are now in their respective first stable states, the gating circuit 28, as well as the gating circuit 29, are again sufficiently biased beyond cut-off such that both of the gating circuits 28, 29 are non-permissive upon the reception of additional inspection pulses applied thereto from the timing wave generator 11. Each time the bistable circuit 27 is triggered in response to a trigger pulse applied thereto from the counting chain 26, indicating a condition in which the timing wave applied to the gating circuits 18, 20 is retarded with respect to the desired relationship, the resulting circuit operations are the same as described. The phase adjusting circuit 12 functions to advance the reference wave applied to the timing wave generator 11 in phase until the desired phase relationship is established between the timing wave applied to the gating circuits 18, 20 and the train of control pulses also applied to the gating circuits 18, 20.

If the timing wave applied to the gating circuits 18, 20 is advanced in phase with respect to the train of control pulses, the control pulses will be entirely coincident with the positive half-cycles of the timing wave applied to the second gating circuit 20. The gating circuit 20 is connected to a counting chain 38 which is, in turn, connected to the bistable circuit 32. Each time this condition occurs, a current pulse is applied from the gating circuit 20 to the counting chain 38. The counting chain 38 is similar in construction and operation to the counting chain 26 already described, and is arranged to complete a count of the same number of current pulses as are counted by the other counting chain 26. Each time the counting chain 38 completes the count of the predetermined number of current pulses, a trigger pulse is applied from the counting chain 38 to the bistable circuit 32. The bistable circuit 32 is triggered into its second stable state. The voltage applied to the gating circuit 29 from the bistable circuit 32 over lead 34 is now of the same polarity as the voltage applied to the gating circuit 29 from the bistable circuit 27 over lead 31. A voltage of the proper polarity and of sufficient level to cause the gating circuit 29 to become quasi-permissive is applied thereto. Voltages of the opposite polarity are applied to the other gating or advance circuit 28 from the bistable circuits 27, 32 over leads 30, 33, respectively, such that the gating circuit 28 is sufficiently biased beyond cut-off to remain non-permissive.

When the next inspection pulse is applied to the gating circuits 28, 29 from the timing wave generator 11 over lead 35, the gating circuit 29 now permissive conducts. A control pulse is applied from the gating circuit 29 to the phase adjusting circuit 12 over lead 39. The phase adjusting circuit 12 functions in response to the control pulse to retard the phase of the reference wave applied to the timing wave generator 11, since the timing wave applied to the gating circuits 18, 20 is indicated as advanced with respect to the desired relationship. The bistable circuit 32 is returned to its first stable state in response to the next reset pulse applied to the bistable circuits 27, 32 from the timing wave generator 11 over lead 37. Each subsequent operation of the bistable circuit 32 in response to a trigger pulse applied thereto from the counting chain 38, indicating the condition in which the timing wave applied to the gating circuits 18, 20 is advanced with respect to the desired relationship, results in the functioning of the phase adjusting circuit 12 to retard the reference wave applied to the timing wave generator 11 in phase. The phase adjusting circuit 12 functions to retard the reference wave in phase until the proper phase relationship is established between the timing wave and the train of control pulses applied to the gating circuits 18, 20.

When the timing wave and train of control pulses are in the desired phase relationship, a part of each of the control pulses will be coincident with the positive half-cycles of each phase of the timing wave individually applied to the respective gating circuits 18, 20. A current pulse is applied from both of the gating circuits 18, 20 to the counting chains 26, 38, respectively. The counting chains 26, 38 complete the count of the predetermined number of current pulses at substantially the same time, and trigger pulses are applied from the counting chains 26, 38 to the respective bistable circuits 27, 32. The bistable circuits 27, 32 are both triggered into their respective second stable states. As the bistable circuits 27, 32 are in corresponding stable states, the voltages applied to the advance gating circuit 28 from the bistable circuits 27, 32 over leads, 30, 33 respectively, are of opposite polarity. The voltages effectively cancel one another, and the advance gating circuit 28 remains sufficiently biased beyond cut-off to be non-permissive to a subsequent inspection pulse. Similarly, the voltages applied to the retard gating circuit 29 from the bistable circuits 27, 32 over leads 31, 34 respectively, are of opposite polarity such that the voltages effectively cancel one another. The retard gating circuit 29 remains sufficiently biased beyond cut-off to also be non-permissive to a subsequent inspection pulse. The phase adjusting circuit 12 is not operated to either retard or advance the reference wave applied to the timing wave generator 11 in phase, and the timing wave generator 11 continues to generate timing waves for application to utilization circuits via terminal 14 and the timing wave, the opposite phases of which are applied to the respective gating circuits 18, 20.

A circuit diagram of one embodiment of the invention given only by way of example is shown in Figure 2, Figures 2*a*, 2*b* and 2*c* taken together. To assist in an understanding of the invention, voltage values have been assigned to various positive and negative terminals connected to suitable sources of potential and arranged in the circuit diagram. The values, however, are given only by way of example and can be altered to meet the requirements of a particular application without departing from the spirit of the invention.

The frequency standard 10 is operated to apply a reference wave of given frequency, for example, 9.6 kc. (kilocycles) supplied as a pulse train of 9600 pulses per second, to the control grid of a triode vacuum tube 45 over an electrical path including a coupling condenser 46. The frequency standard 10 is of conventional design and, for example, may be a tuning fork oscillator circuit including electron vacuum tubes or transistors. Many examples of frequency standards for supplying a reference wave of constant frequency and suitable for use with the arrangement of the invention are known. The tube 45 is sufficiently biased beyond cut-off that it conducts only in response to the pulses included in the reference wave obtained from the frequency standard 10. A train of negative pulses appear at the plate of the tube 45 which are applied to the cathode circuit of a first triode vacuum tube 47 over an electrical path including lead 48, coupling condenser 49 and a resistor 50. The negative pulses are also applied to the cathode circuit of a second triode vacuum tube 51 over an electrical path including lead 48, condenser 49 and a resistor 52.

The tubes 47, 51 are included in a bistable multivibrator 53 and may be arranged in a duo-triode vacuum tube, as shown. Various other triode vacuum tubes to be described which may be arranged in a similar manner have been so indicated in Figure 2. The multivibrator 53 is arranged in a circuit having two stable states of equilibrium. In one stable state, tube 51 is conducting, while tube 47 is cut-off. In the second stable state, the tube 51 previously conducting is cut-off, and the tube 47 previously cut-off is conducting. Two trigger pulses are required to change the multivibrator 53 from one stable state to the other stable state and return. Assumming for the moment that tube 47 is conducting and that tube 51 is cut-off, the next negative pulse applied to the cathode of tube 51 causes the cathode to become negative with respect to the control grid of tube 51. Tube 51 becomes conducting, causing the voltage applied to the control grid of tube 47 from the plate of tube 51 to become more negative with respect to the cathode of tube 47. Tube 47 is cut-off. When the next negative pulse is applied to the cathode of tube 47, tube 47 becomes conducting. The conduction of tube 47 causes tube 51 to be cut-off and so on.

Each time the multivibrator 53 is triggered into its stable state in which tube 51 is conducting and tube 47 is cut-off, in response to the negative pulses applied thereto from the plate of tube 45, a negative pulse is applied from the plate of tube 51 to the cathode circuit of a triode vacuum tube 54 over an electrical path including resistor 55, condenser 56, and resistor 57. The negative pulse is also applied to the cathode circuit of a second triode vacuum tube 58 over an electrical path including the resistor 55, the condenser 56, a lead 59 and a resistor 60. The tubes 54, 58 are included in a bistable multivibrator 61 which is similar in operation to the multivibrator 53, just described. The multivibrator 61 is included in a circuit having two stable states. In one stable state tube 54 conducts, while tube 58 is cut-off. In the other stable state, tube 54 is cut-off, while tube 58 conducts. As the negative pulses are applied to the cathode circuits of the tubes 54, 58 in the multivibrator 61 from the plate of tube 51 in the multivibrator 53, the multivibrator 61 assumes first one stable state and then the other. A negative pulse will appear at the plate of tube 58 during periods in which tube 58 is conducting, while a negative pulse will appear at the plate of the other tube 54 in the multivibrator 61 during periods in which it is conducting.

Both of the multivibrators 53, 61 are arranged as binaries, and are included in a binary or frequency dividing chain. The multivibrators 53, 61 each function to divide the frequency of the reference wave applied thereto by a factor of two. Thus, assuming that a reference wave having a frequency of 9.6 kc. is applied to the first multivibrator 53 in the chain from the circuit including the frequency standard 10 and tube 45, the multivibrator 53 functions to alter the frequency of the reference wave such that a reference wave having a frequency of 4.8 kc. is applied to the next multivibrator 61 in the chain. The multivibrator 61 functions to divide the frequency of the reference wave applied thereto by a factor of two. The negative pulses appearing at the plate of tube 54 are applied as a reference wave having a frequency of 2.4 kc. from the plate of tube 54 to the control grid of a triode vacuum tube 62 over an electrical path including resistor 63, condenser 64. The control grid of tube 62 is normally positive with respect to the cathode thereof such that tube 62 is conducting. When a differentiated negative pulse is applied to the control grid of tube 62, the control grid becomes negative with respect to the cathode of tube 62. Tube 62 is cut-off, causing a positive pulse to appear at the plate thereof. The positive pulse is applied from the plate of tube 62 to the control grid of a triode vacuum tube 65 over an electrical path including lead 66 and a resistor 67. Tube 65 is normally conducting. When the positive pulse is applied to the control grid of tube 65, the control grid becomes more positive with respect to the cathode of tube 65. There is an increase in plate current, causing the cathode of tube 65 to become more positive. Tube 65 is connected as a cathode follower, and a positive pulse developed across a resistor 68 connected between ground and the cathode of tube 65 is applied to the timing wave generator 11 over lead 69. The term ground, as used in the specification, is to be understood as referring to a point of fixed reference potential.

The negative pulses appearing at the plate of the other tube 58 in the multivibrator 61 are applied to the control grid of a triode vacuum tube 69 over an electrical path including resistor 70, condenser 71. The reference wave developed at the plate of tube 58 is of the same frequency, 2.4 kc., as the reference wave developed at the plate of tube 54 but is one hundred and eighty degrees out of phase therewith. As in the case of tube 62, the control grid of tube 69 is normally positive with respect to the cathode thereof, causing tube 69 to conduct. When a differentiated negative pulse is applied to the control grid of tube 69 from the plate of tube 58, the control grid becomes negative with respect to the cathode. Tube 69 is cut-off, and a positive pulse is applied from the plate of tube 69 to the control grid of a triode vacuum tube 72 over an electrical path including lead 73 and resistor 74. The control grid of tube 72 which is normally conducting becomes more positive with respect to the cathode of tube 72. There is a resulting increase in plate current, causing the cathode of tube 72 to become more positive. Tube 72 is connected as a cathode follower, and a positive pulse developed across a resistor 75 connected between the cathode of tube 72 and ground is applied over lead 76 to the timing wave generator 11.

In this manner, the opposite phases of a reference wave having a frequency of 2.4 kc. are individually applied from the frequency standard 10 to the timing wave generator 11 over the respective leads 69, 76. The timing wave generator 11 is arranged to function in response to the reference wave to generate a number of timing waves for application over separate leads represented by the lead 13 to different output terminals represented by the terminal 14. The timing waves are applied from the terminal 14 to utilization circuits, causing the circuits to function in the desired and proper time sequence. The timing wave generator 11 may be of the type including a number of magnetic core shift registers arranged and operated in the manner shown in copending patent application Ser. No. 616,275 filed October 16, 1956 by Thomas R. Sheridan and Hajime J. Kishi and Anthony Liguori for Timing Circuit. On the other hand, the timing wave generator 11 may include an arrangement of electron vacuum tubes or electromagnetic relay devices, many examples of which are found in the art.

The proper operation of the utilization circuits to which the timing waves generated by the timing wave generator 11 are applied via terminal 14 depends upon the establishment and maintenance of a correct phase relationship between the timing waves and an incoming signal processed by the utilization circuits. According to the invention, opposite phases of a timing wave generated by the timing wave generator 11 are individually applied to the cathode circuits of a pair of triode vacuum tubes 77, 78 included in a bistable multivibrator 79. One phase of the timing wave including a series of negative pulses is applied to the cathode of tube 77 over an electrical path including lead 80, condenser 81 and resistor 82, while the other phase of the timing wave is applied to the cathode of tube 78 over an electrical path including lead 83, condenser 84 and resistor 85. The multivibrator 79 is arranged in a circuit having two stable states, identified as the pulse shaper 17 in Figure 1. When a differentiated negative pulse is applied to the cathode of tube 77 from the timing wave generator 11 over lead 80, the multivibrator 79 assumes its stable state in which tube 77 is conducting and tube 78 is cut-off. A differentiated negative pulse applied to the cathode of tube 78 causes the multivibrator 79 to be triggered into its stable state in which tube 77 is cut-off and tube 78 is conducting. As opposite phases of the same timing wave are individually applied to the cathodes of the respective tubes 77, 78, the multivibrator 79 assumes first one stable state and then the other. A square wave is developed at the plate of tube 77 which is applied to the control grid of a triode vacuum tube 86 over an electrical path including lead 87 and resistor 88. A further square wave is developed at the plate of tube 78 which is one hundred and eighty degrees out of phase with the square wave developed at the plate of tube 77. The square wave developed at the plate of tube 78 is applied to the control grid of a triode vacuum tube 89 over an electrical path including lead 90 and resistor 91. The tube 86 is included in the gating circuit 20 shown in Figure 1, while the tube 89 is included in the gating circuit 18 also shown in Figure 1.

A train of control pulses is derived from the incoming signal processed by the utilization circuits to which the timing waves generated by the timing wave generator 11 are applied via terminal 14, the train of control pulses being applied to an input terminal 22. It will be assumed that the incoming signal is a telegraph code signal including marking and spacing elements. Marking elements are generally defined as intervals of current flow, while spacing elements are generally defined as intervals of no current flow. A change in the signal condition from space-to-mark is defined as a negative transition, while a change in signal condition from mark-to-space is defined as a positive transition. Negative pulses produced at each negative transition or start-of-mark are applied to the input terminal 22. One method of deriving the start-of-mark pulses is shown and described in Patent No. 2,714,627 issued on August 2, 1955, to E. R. Shenk and P. E. Volz for Electronic Multiplex Telegraph Receiving Terminal Apparatus.

The start-of-mark pulses are applied from the terminal 22 to the cathode circuit of a triode vacuum tube 93 over an electrical path including lead 94 and a coupling condenser 95. The tube 93 is included in a monostable multivibrator 96 of conventional design which also includes a second triode vacuum tube 97. The multivibrator 96 is arranged in a circuit having a single stable state identified as a trigger circuit 23 in Figure 1. Normally, tube 97 is conducting, and tube 93 is cut-off. A negative pulse applied to the cathode of tube 93 causes the multivibrator 96 to be triggered into a quasi-stable state in which tube 93 is conducting and tube 97 is cut-off. Following a time interval determined by the value of condenser 98 and resistor 99, the multivibrator 96 automatically reverts back to its single stable state in which tube 93 is cut-off and tube 97 is conducting. Each time the multivibrator 96 is triggered into its quasi-stable state in response to a negative, start-of-mark pulse applied to the cathode of tube 93 from the terminal 22, a positive pulse appears at the plate of tube 97 having a duration determined by the time constant of the multivibrator 96. The positive pulse is applied from the plate of tube 97 to the control grid of tube 86 over an electrical path including resistor 100, lead 101 and lead 87. The positive pulse is also applied from the plate of tube 97 to the control grid of tube 89 over an electrical path including resistor 102, lead 103 and lead 90. The frequency of the timing wave, the opposite phases of which are applied to the multivibrator 79 from the timing wave generator 11, is determined such that the frequency of the square waves applied to the control grids of the tubes 86, 89 from the multivibrator 79 corresponds to the frequency of the incoming signal. If the start-of-mark pulses applied to terminal 22 are derived from a four channel telegraph signal having a frequency of 171$\frac{3}{7}$ cycles per second, then a timing wave having a frequency of 171$\frac{3}{7}$ cycles per second must be generated by the timing wave generator 11 and applied to the multivibrator 79. On the other hand, if the start-of-mark pulses are derived from a two channel telegraph signal having a frequency of 85$\frac{5}{7}$ cycles per second, a timing wave having a frequency of 85$\frac{5}{7}$ must be generated by the timing wave generator 11 and applied to the multivibrator 79.

Tubes 86, 89 are sufficiently biased such that neither of the tubes 86 or 89 will conduct in response to the square waves applied to the respective control grids thereof by the operation of the multivibrator 79, regardless of the polarity of the square waves. When a start-of-mark pulse is applied as a positive pulse of fixed duration to the control grids of tubes 86, 89 upon the operation of multivibrator 96 in response to a negative, start-of-mark pulse, part or all of the positive pulse will coincide with the positive half-cycle of a square wave applied to the control grid of one of the tubes 86 or 89. The appearance of the positive pulse plus the positive half-cycle of the square wave causes a voltage of sufficient level to be applied to the control grid of the particular tube to make the control grid sufficiently positive with respect to the cathode of the tube to cause the tube to conduct. A negative pulse appears at the plate of the tube. If the positive pulse is entirely coincident with a positive half-cycle of the square wave applied to the control grid of tube 86, then tube 86 conducts. As the positive pulse will be entirely coincident with a negative half-cycle of the square wave applied to the control grid of tube 89, tube 89 remains biased beyond cut-off and will not conduct. If the positive pulse is entirely coincident with a positive half-cycle of the square wave applied to the control grid of tube 89, tube 89 conducts and tube 86 remains cut-off. When part of the positive pulse is coincident with a positive half-cycle of both of the square waves applied to the respective control grids of tubes 86, 89 such that it straddles a transition of each of the square waves, both of the tubes 86, 89 conduct.

Referring to Figure 3, curve 110 represents the incoming signal; curve 111 represents the train of start-of-mark or positive pulses applied to the respective control grids of tubes 86, 89 from the multivibrator 96; curve 112 represents the square wave applied to the control grid of tube 89; and curve 113 represents the square wave applied to the control grid of tube 86. A comparison of curves 111, 112 and 113 will show that the start-of-mark pulses 111 will each be coincident with a part of or, in other words, straddle a transition of both of the square waves 112, 113 when a correct phase relationship is established there-between. When this condition occurs, both of the tubes 86, 89 will conduct. If the start-of-mark pulses are entirely coincident with positive half-cycles of the square wave applied to the control grid of tube 89, the resulting waveform is shown by the curve 114. The timing wave generated by the timing wave generator 11, both phases of which are applied to the multivibrator 79, is said to be retarded in phase with respect to the desired or correct phase relationship. Each time that tube 89 conducts as a result of the occurrence of this condition, a negative pulse is applied from the plate of tube 89 to the cathode circuit of a triode vacuum tube 120 over an electrical path including lead 121, resistor 122, condenser 123 and resistor 124. The negative pulse is also applied from the plate of tube 89 to the cathode circuit of a triode vacuum tube 125 over an electrical path including lead 121, resistor 122, condenser 123, lead 126 and resistor 127.

Tubes 120, 125 are included in a bistable multivibrator 128 which is, in turn, included in a circuit having two stable states. The multivibrator 128 assumes first one stable state in which tube 120 is conducting and tube 125 is cut-off and, then, a second stable state in which tube 120 is cut-off and tube 125 is conducting in response to successive negative pulses applied thereto from the plate of tube 89. Multivibrator 128 is included in a binary or frequency dividing chain 26 which also includes a plurality of other bistable multivibrators 129, 130, 131. The bistable multivibrator 129, 130, 131 are similar in construction and operation to the first multivibrator 128 in the chain 26, and therefore, have been shown in Figure 2*a* in block form for purposes of brevity. Each of the multivibrators 128, 129, 130, 131 in the chain 26 is operated as a binary and divides the frequency of the signal applied thereto by a factor of two. Thus, for every two negative pulses applied to the cathode of tube 120, a single negative pulse is applied from the plate of tube 125 to the multivibrator 129 over the electrical path including lead 132, resistor 133 and condenser 134. This is true because two pulses are required to cause the multivibrator 128 to be triggered from the stable state in which tube 125 is conducting to the stable state in which tube 125 is cut-off and return. In much the same manner, multivibrator 129 functions to apply a single negative pulse to the multivibrator 130 over an electrical path including lead 135, resistor 136 and condenser 137 for every two negative pulses applied thereto from multivibrator 128. Multivibrator 130 functions to apply a single negative pulse to multivibrator 131 over an electrical path including lead 138, resistor 139 and condenser 140 for every two negative pulses applied thereto from multivibrator 129 and so on. A sixteen count binary chain 26 is provided.

When the start-of-mark pulses are entirely coincident with positive half-cycles of the square wave applied to the control grid of tube 86, the resulting waveform is shown in curve 115 of Figure 3. The timing wave, both phases of which are applied from the timing wave generator 11 to the multivibrator 79, is said to be advanced in phase with respect to the desired phase relationship. Each time that tube 86 conducts as a result of the occurrence of this condition, a negative pulse is applied from the plate of tube 86 to the cathode circuit of a triode vacuum tube 141 over an electrical path including lead 142, resistor 143, condenser 144 and resistor 145. The negative pulse is applied at the same time from the plate of tube 86 to the cathode circuit of a second triode vacuum tube 146 over an electrical path including lead 142, resistor 143, condenser 144, lead 147 and resistor 148. Tubes 141, 146 are included in a bistable multivibrator 149. Multivibrator 149 is included in a binary or frequency dividing chain 38 which also includes a plurality of other multivibrators 150, 151, 152. The operation of the respective multivibrators 149, 150, 151, 152 as binaries in the chain 38 is exactly the same as that of multivibrator 128 in the chain 26 already described in detail. Therefore, the description of the operation of the series-connected multivibrators 149, 150, 151, 152 in chain 38 need not be repeated. Each of the multivibrators 149, 150, 151, 152 functions to divide the frequency of the signal applied thereto by a factor of two such that a sixteen count binary chain 38 is provided. While the binary chains 26, 38 are shown by way of example as sixteen count binary chains, the invention is not limited to this particular construction. The number of counts completed by the respective chains 26, 38 may be varied according to a particular application by merely adding to or removing from the respective chains 26, 38 the necessary number of multivibrator stages. Thus, eight count binary chains may be provided by removing the last multivibrators 131, 152 from the respective chains 26, 38. Thirty-two count binary chains may be provided by adding a multivibrator to each of the chains 26, 38 and so on.

The last multivibrator 131 in the chain 26 is connected over an electrical path including lead 153, resistor 154 and condenser 155 to the cathode circuit of a triode vacuum tube 156. Tube 156 is included in a bistable multivibrator 157 also including a second triode vacuum tube 158. The multivibrator 157 is included in a circuit 27, as shown in block form in Figure 1, having two stable states. In one stable state, tube 158 is conducting, and tube 156 is cut-off. In the other stable state, tube 158 is cut-off, and tube 156 is conducting. In the absence of a negative, trigger pulse applied to the cathode of tube 156 from the multivibrator 131 in chain 26, the multivibrator 157 is made to assume its stable state in which tube 158 is conducting and tube 156 is cut-off by circuit operations to be described.

In a similar manner, the last multivibrator 152 in the chain 38 is connected to the cathode circuit of a triode vacuum tube 159 included in a bistable multivibrator 160 over an electrical path including lead 161, resistor 162 and condenser 163. Multivibrator 160 includes a second triode vacuum tube 164 and is itself included in a circuit 32, as shown in block form in Figure 1, having two stable states. The multivibrator 160 is arranged to assume either a first stable state in which tube 164 is conducting and tube 159 is cut-off or a second stable state in which tube 164 is cut-off and tube 159 is conducting. In the absence of a negative, trigger pulse applied to the cathode of tube 159 from the multivibrator 152 in the chain 38, the multivibrator 160 is made to assume its stable state in which tube 164 is conducting and tube 159 is cut-off by circuit operations to be described.

The control grid of a triode vacuum tube 165 is connected to the plate of tube 156 in multivibrator 157 over an electrical path including lead 166 and resistor 167 and to the plate of tube 164 in multivibrator 160 over an electrical path including lead 168 and resistor 169. Tube 165 is included in the gating circuit 29 shown in block form in Figure 1. The control grid of a second triode vacuum tube 170 included in the gating circuit 28, also shown in block form in Figure 1, is connected to the plate of tube 158 in multivibrator 157 over an electrical path including lead 171 and resistor 172 and to the plate of tube 159 in multivibrator 160 over an electrical path including lead 173 and resistor 174. Tubes 170, 165 are both biased beyond cut-off such that they are normally cut-off or non-conducting. As mentioned above, the multivibrator 157 is normally in its stable state in which tube 158 is conducting and tube 156 is cut-off, while the multivibrator 160 is normally in its stable state in which tube 164 is conducting and tube 159 is cut-off. A positive voltage is applied from the plate of tube 156 in multivibrator 157 to the control grid of tube 165 over lead 166, while a negative voltage of similar magnitude is applied to the control grid of tube 165 from the plate of tube 164 in multivibrator 160 over lead 168. As a result, the control grid is not raised sufficiently positive with respect to the cathode of tube 165 to cause tube 165 to conduct, and tube 165 remains cut-off. A negative voltage is applied to the control grid of tube 170 from the plate of tube 158 in multivibrator 157 over lead 171, while a positive voltage of similar magnitude is applied to the control grid of tube 170 from the plate of tube 159 in multivibrator 160 over lead 173. As in the case of tube 165, the control grid of tube 170 is not raised sufficiently positive with respect to the cathode of tube 170 to cause tube 170 to conduct, and tube 170 remains cut-off. In normal or standby condition, therefore, both of the gating circuits 28, 29 are blocked and non-conducting.

It will first be assumed that the timing wave applied to the multivibrator 79 from the timing wave generator 11 is retarded in phase with respect to the desired relationship. The start-of-mark pulses will each be coincident with positive half-cycles of the square wave applied to the control grid of tube 89, the resulting waveform being as represented by curve 114 in Figure 3. Tube 89 will conduct each time a start-of-mark pulse is applied to the control grid thereof, and a negative pulse is applied from the plate of tube 89 to the cathode of tube 120 in multivibrator 128. When the sixteenth start-of-mark pulse has been applied to the control grid of tube 89 and counted by the operation of the binary counting chain 26 in the manner described, a negative, differentiated pulse is applied from the multivibrator 131 in the chain 26 to the cathode circuit of tube 156 in multivibrator 157 over lead 153. The application of the negative pulse to the cathode of tube 156 causes the control grid of tube 156 to become positive with respect to the cathode, and tube 156 conducts. The voltage applied from the plate of tube 156 to the control grid of tube 158 becomes more negative, and tube 158 is cut-off. The multivibrator 157 assumes its stable state in which tube 156 is conducting and tube 158 is cut-off. A positive voltage is now applied to the control grid of tube 170 from the plate of tube 158 over lead 171. As multivibrator 160 remains in its stable state in which tube 159 is cut-off and tube 164 is conducting, a positive voltage is also applied to the control grid of tube 170 from the plate of tube 159 over lead 173. The positive voltage applied to the control grid of tube 170 is of a sufficient level to place the control grid of tube 170 in a quasi-permissive state. As a negative voltage is applied to the control grid of tube 165 from the plate of tube 156 over lead 166 and from the plate of tube 164 over lead 168, tube 165 continues to be sufficiently biased beyond cut-off such that the control grid thereof is not placed in a quasi-permissive state.

A positive, inspection pulse is applied at regular intervals from the timing wave generator 11 to the respective control grids of tubes 165, 170. The inspection pulse is applied to the control grid of tube 165 over an electrical path including lead 175, an unidirectional impedance device 176 and a coupling condenser 177, the inspection pulse being applied to the control grid of tube 170 over an electrical path including lead 175, an unidirectional impedance device 178 and a coupling condenser 179. As the control grid of tube 170 has been placed in a quasi-permissive state by the operation of multivibrator 157, the next inspection pulse applied to the control grid of tube 170, following the operation of the multivibrator 157, causes the control grid to become sufficiently positive with respect to the cathode of tube 170 to, in turn, cause tube 170 to conduct. A negative pulse is applied from the plate of tube 170 to the cathode circuits of tubes 47, 51 in multivibrator 53 over an electrical path including lead 180, resistor 181 and condenser 182. Assuming that the multivibrator 53 has just been triggered into its stable state in which tube 47 is cut off and tube 51 is conducting, the reception of the negative pulse from the plate of tube 170 over lead 180 will cause the multivibrator 53 to be reset to its other stable state in which tube 47 is conducting and tube 51 is cut off. The square wave appearing at the plate of tube 51 is, in effect, advanced in phase, resulting in the timing wave generated by the timing wave generator 11 and applied to the multivibrator 79 being advanced in phase a corresponding amount. For example, assuming that a timing wave having a frequency of 171 3/7 cycles per second or 85 5/7 cycles per second is applied to the multivibrator 79 and that the multivibrator 53 is operated to produce a square wave having a frequency of 4.8 kc., the transitions of the timing wave would be advanced in time by 104 microseconds. The action is to advance the timing wave in phase, since the operation of the binary counting chain 26 has indicated that the timing wave is retarded with respect to the desired relationship.

In order to accomplish the actual phase shift in the timing wave applied to the multivibrator 79 it is necessary that the operation of the multivibrator 53 in response to the negative pulse applied thereto from the plate of tube 170 occur synchronously with the timing wave and not at a random time. The inspection pulses applied to the respective control grids of tubes 170, 165 from the timing wave generator 11 are arranged in time such that they occur synchronously with the timing wave. In actual practice, the inspection pulses may be selected ones of the timing pulses included in the timing wave which, in addition, to being included in the timing wave are applied at regular intervals over lead 175 to the respective control grids of tubes 165, 170 as inspection pulses.

Referring for the moment to Figure 4, the waveform appearing at the plate of tube 51 or driving side of multivibrator 53 is represented by curve 185. The waveforms appearing at the respective plates of tubes 58, 54 in multivibrator 61 are represented by curves 186, 187, respectively. As the multivibrators 53, 61 function as binaries in the manner described, the frequency of the square waves appearing at the respective plates of tubes 54, 58 will be one-half the frequency of the square wave appearing at the plate of tube 51. The waveform which appears at the plate of tube 51 upon the application of the negative pulse to the multivibrator 53 from the plate of tube 170 is represented by curve 185*a*. In effect, a pulse is added to the train of negative pulses applied to the multivibrator 53 from the plate of tube 45, causing the square wave appearing at the plate of tube 51 to advance one half-cycle of the operating frequency in phase. This action is more clearly understood by an examination of curve 186*a* which shows the resulting waveform appearing at the plate of tube 58 and of curve 187*a* which shows the resulting waveform appearing at the plate of tube 54. A comparison of curves 186*a*, 187*a* with the curves 186, 187, respectively, will show that in relation to time the square waves appearing at the respective plates of tubes 54, 58 have been advanced in phase by a time interval substantially equal to one half-cycle of the square wave appearing at the plate of tube 51 in multivibrator 53.

Immediately following the application of each inspection pulse from timing wave generator 11 to the respective control grids of tubes 170, 165 over lead 175, a positive, reset pulse is applied from the timing wave generator 11 to the control grid of a triode vacuum tube 188 over an electrical path including lead 189 and coupling condenser 190. As in the case of the inspection pulses, the reset pulses may be selected ones of the timing pulses included in the timing wave applied to multivibrator 79. Tube 188 functions as a gating device and is normally biased beyond cut-off. Each reset pulse applied to the control grid of tube 188 appears as a negative pulse at the plate of tube 188 which is applied to the cathode of tube 158 in multivibrator 157 over an electrical path including lead 191, condenser 192 and resistor 193. The negative pulse is also applied to the cathode of tube 164 in multivibrator 160 over an electrical path including lead 194, condenser 195 and resistor 196.

The circuit operations for causing an advance in phase of the timing wave generated by the timing wave generator 11 and applied to the multivibrator 79 were begun by the triggering of multivibrator 157 into its stable state in which tube 156 is conducting and tube 158 is cut-off in response to the trigger pulse applied thereto by the operation of the binary counting chain 26. The next reset pulse following this action, therefore, confirms the status of multivibrator 160 in which the tube 159 is cut-off and tube 164 is conducting and resets multivibrator 157 into its stable state in which tube 156 is cut-off and tube 158 is conducting. The respective control grids of tubes 170, 165 are again biased sufficiently beyond cut-off such that both tubes 170, 165 remain non-conducting upon the reception of subsequent inspection pulses. Upon the application of the next negative, trigger pulse to the multivibrator 157 from the multivibrator 131 in the binary counting chain 26, the multivabrator 157 is again set in its stable state in which tube 156 is conducting and tube 158 is cut-off. The circuit operations described above are repeated. The phasing system of the invention will continue to function in this manner to advance the timing wave in phase until the correct phase relationship is established between the timing wave and the train of start-of-mark pulses. As indicated this condition will occur when the start-of-mark pulses are each coincident with positive half-cycles of both of the square waves applied to the respective grids of tubes 86, 89. As may be seen by referring to Figure 3, the start-of-mark pulses will each straddle a transition of the respective square waves.

When the timing wave is advanced in phase with respect to the desired relationship, tube 86 will conduct upon the application of each start-of-mark pulse to the control grid thereof. The negative pulses appearing at the plate of tube 86 are applied to the binary counting chain 38. When the binary counting chain 38 has counted sixteen of the negative pulses, a negative, trigger pulse is applied to multivibrator 160. Multivibrator 160 is triggered into its stable state in which tube 159 is conducting and tube 164 is cut-off. Because of the manner in which the interconnections are completed between the multivibrators 157, 160 and the respective control grids of tubes 165, 170 already described, the control grid of tube 165 is placed in a quasi-permissive state. Tube 165 conducts upon the application of the next inspection pulse to the control grid thereof. A negative pulse is applied from the plate of tube 165 to the cathode of a triode vacuum tube 197 over an electrical path including lead 198, resistor 199 and condenser 200.

Tube 197 is included in a monostable multivibrator 201 also including a second triode vacuum tube 202. Multivibrator 201 is of conventional design and is arranged in a circuit having a single stable state in which tube 202 is conducting and tube 197 is cut-off. When the differentiated negative pulse is applied to the cathode of tube 197 from the plate of tube 165 over lead 198, multivibrator 201 is triggered into a second stable state in which tube 202 is cut-off and tube 197 is conducting. A positive pulse is applied from the plate of tube 202 to the control grid of a triode vacuum tube 203 over an electrical path including lead 204 and resistor 205. Tube 203 is normally biased beyond cut-off. When the positive pulse is applied to the control grid thereof, tube 203 conducts and a negative pulse is applied to the plate of tube 51 or driving side of multivibrator 53 over lead 208. Following a time interval determined by the value of condenser 206 and resistor 207, multivibrator 201 automatically reverts back to its single stable state in which tube 197 is cut-off and tube 202 is conducting. Tube 203 conducts, therefore, for the duration of the trigger action determined by the time constant of multivibrator 201.

Since tube 203 is slaved to tube 51, the multivibrator 53 cannot change states until the tube 203 ceases conducting upon the reverting of multivibrator 201 back to its single stable state. By making the time constant of multivibrator 201 greater than one-half cycle and less than a full cycle of the frequency of the square wave appearing at the plate of tube 51, a transition of the square wave will be skipped which is, in effect, a retard action. Referring to Figure 4, the resulting waveform appearing at the plate of tube 51 is represented by curve 185*b*. It may be seen that, in effect, a half-cycle of the frequency of the square wave is removed therefrom. A comparison of the waveform appearing at the plate of tube 58 represented by curve 186*b* and of the waveform appearing at the plate of tube 54 represented by curve 187*b* with curves 186, 187, respectively, in relation to time serves to illustrate the fact that the square waves appearing at the respective plates of tubes 54, 58 have been retarded in phase. The action is to retard the timing wave applied to multivibrator 79 in phase, since the operation of the binary counting chain 38 has indicated that the timing wave is advanced with respect to the desired relationship. The application of the reset pulse to the multivibrators 157, 160 from the plate of tube 188 confirms the status of multivbrator 157 and causes multivibrator 160 to be reset to its stable state in which tube 159 is cut-off and tube 164 is conducting. Tube 165 is cut-off, and tubes 170, 165 remain non-conducting in response to the reception of subsequent inspection pulses. The above circuit operations will be repeated until the correct phase relationship is established between the start-of-mark pulses and the square waves applied to the respective control grids of tubes 86, 89.

By advancing or retarding the timing wave applied to multivibrator 79 in phase according to the operation of tubes 86, 89, the correct phase relationship can be established and maintained between the other timing waves generated by the timing wave generator 11 and applied to utilization circuits via terminal 14 and the incoming signal from which the start-of-mark pulses are derived. Multivibrators 53, 61 function as the phase adjusting circuit 12 shown in Figure 1. A feature of the invention is the fact that when the correct or desired phase relationship is established, no phase correction whatever of the reference wave applied to the timing wave generator 11 occurs. As a part of each start-of-mark pulse will be coincident with positive half-cycles of both of the respective square waves applied to the tubes 86, 89, both of the tubes 86, 89 will conduct. The binary counting chains 26, 28 are operated in unison to each complete the count of sixteen pulses applied thereto from the tubes 89, 86, respectively. Multivibrator 157 is triggered into its stable state in which tube 156 is conducting and tube 158 is cut-off, while multivibrator 160 is triggered at substantially the same time into its stable state in which tube 159 is conducting and tube 164 is cut-off. As the multivibrators 157, 160 are in corresponding stable states, the voltages applied to the respective control grids of tubes 165, 170 are not of a sufficient level to cause either of the control grids to be in a permissive state in response to the next inspection pulse applied thereto. Tubes 165, 170 both remain non-conducting, and no phase correction of the reference wave applied to the timing wave generator 11 takes place. Multivibrators 157, 160 are both reset to their respective normal stable states in response to the next reset pulse. The above circuit operations will continue as long as the desired phase relationship exists.

Reference has been made to two possible out-of-phase conditions which can occur. The timing wave may be retarded or advanced in phase with respect to the desired relationship. Actually, a third out-of-phase condition can also occur. Referring to Figure 3, the correct phase relationship exists when the trailing edge of a positive half-cycle of the square wave applied to tube 89 represented by curve 112 and the leading edge of a positive half-cycle of the square wave applied to tube 86 represented by curve 113 bisect each start-of-mark pulse represented by curve 111. This relationship is established and maintained by the advance and retard actions already described. The start-of-mark pulses are, in effect, locked in this relationship. It is possible, however, that a third out-of-phase condition may occur in which the leading edge of a positive half-cycle of the square wave represented by curve 112 and the trailing edge of a positive half-cycle of the square wave represented by curve 113 bisect each start-of-mark pulse. This condition may occur, for example, on start-up. As both of the tubes 86, 89 conduct when this condition exists, it would appear that a correct phase relationship is established and that no correction of the condition would be made by the phasing system.

In actual practice, a certain amount of hunting occurs such that the start-of-mark pulses, in effect, will move entirely to one side or the other of the transitions of the square wave and will not remain in the third condition. As soon as the start-of-mark pulses are entirely coincident with the positive half-cycles of one of the square waves, the retard or advance action of the phasing system takes place depending upon which one of the tubes 86 or 89 becomes conducting in response to the start-of-mark pulses. The particular action will continue until the square waves represented by curves 112, 113 have been shifted in phase one hundred and eighty degrees, at which time the correct phase relationship will be established. The point is that the phasing system cannot operate, in effect, to lock the start-of-mark pulses in the phase relationship established upon the occurrence of the third condition, as is the case when the correct phase relationship or condition is established. The phasing system automatically functions to retard or advance the timing wave applied to multivibrator 79 and, therefore, the square waves represented by curves 112, 113 in phase until the correct phase relationship is established when any condition other than that in which the correct or desired phase relationship is established occurs. As a result, the timing waves generated by the timing wave generator 11 and applied to utilization circuits via terminal 14 will be maintained in the correct phase relationship with respect to the incoming signal from which the start-of-mark pulses are derived.

A functional block diagram of a telegraph communication system in which the phasing system of the invention may find application is shown in Figure 5. The telegraph communication system shown is an automatic error correction system. The communication system includes at least two stations 1 and 2 which are electrically connected together over different electrical paths 215, 216 for two way communication. Code characters are produced by the operation of a telegraph transmitter 217 at the first station 1 for transmission over a channel A to a transmitter unit 218. Code characters are also produced by the operation of a second telegraph transmitter 219 for transmission over a second channel B to the transmitter unit 218. Each code character transmitted over channel A and over channel B includes five signal elements arranged according to the fixed-length five-unit telegraph code. Each character in the code includes five signal elements, the respective signal elements being marking or spacing in nature. A character may include five marking elements, five spacing elements or a combination of marking and spacing elements arranged in a predetermined manner.

In the transmission of a five-unit code character over a communication system, the code character may be distorted. Spacing elements may be filled in by noise to form marking elements, and marking elements may be deleted by atmospheric conditions to form spacing elements. Because the ratio of marking elements to spacing elements is different in each code character of the five-unit telegraph code, it is difficult to design equipment which can automatically function to detect a distorted code character and, thereafter, place the necessary correction equipment in operation. Various protected telegraph codes have been devised to avoid this difficulty. For example, each code character in the seven-unit protected telegraph code includes three marking elements and four spacing elements. By counting the number of marking elements in each code character received over a communication system, a character which has been distorted such that it includes more or less than three marking elements can be readily determined.

In the communication system shown in the block diagram given in Fig. 5, the five-unit code characters transmitted over the channels A, B are received in order by the transmitter unit 218 and are applied, in turn, from the transmitter unit 218 to a transmitter control unit 220 over lead 221. The transmitter control unit 220 functions to convert the five-unit code characters into seven-unit code characters. The converted code characters are thereafter applied from the transmitter control unit 220 back to the transmitter unit 218 over lead 222. The transmitter unit 218 is operated to transmit the converted code characters appearing over channels A, B over the electrical path 215 to the receiver unit 223 located at the second station 2 in multiplex fashion. As the code characters are transmitted over the electrical path 215, equipment is provided in the transmitter unit 218 for storing on a continuous basis the last three code characters transmitted over channel A and the last three code characters transmitted over channel B.

In order to accomplish the transmission of the code characters over channels A, B, the transmitter unit 218 and transmitter control unit 220 must operate in a predetermined time sequence. Thus, the code characters are first received in order over the channels A, B by the transmitter unit 218. The code characters are then applied, in turn, to the transmitter control unit 220. The transmitter control unit 220 operates to convert the code characters and to apply the converted code characters back to the transmitter unit 218. The transmitter unit 218 thereafter operates to transmit the converted code characters in multiple fashion over the electrical path 215. A transmitter timing unit 224 is operated in response to a reference wave of predetermined frequency applied to the transmitter timing unit 224 from a frequency standard unit 225 over lead 226. The transmitter timing unit 224 operates to produce timing signals of a predetermined frequency which are applied in a given order over leads represented by lead 227 to the transmitter unit 218 and over leads represented by lead 228 to the transmitter control unit 220. The transmitter unit 218 and transmitter control unit 220 operate in response to the timing signals to perform the functions outlined above.

The multiplex signal transmitted over the electrical path 215 which may include, for example, a radio frequency transmission system, is received by the receiver unit 223 located at the second station 2. The seven-unit code characters are applied, in turn, from the receiver unit 223 to a receiver control unit 229 over lead 230. The receiver control unit 229 converts the seven-unit code characters into five-unit code characters. Equipment is included in the receiver control unit 229 for counting the number of marking elements in each seven-unit code character received. It will be assumed for the moment that all the code characters are properly received without distortion. The converted, five-unit code characters are applied from the receiver control unit 229 back to the receiver unit 223 over lead 231. The receiver unit 223 functions to distribute the code characters transmitted over channel A to a first telegraph printer 232 and the code characters transmitted over channel B to a second telegraph printer 233.

The timing of the receiver unit 223 and of the receiver control unit 229 is controlled by a receiver timing unit 234. A reference wave is applied from a frequency standard unit 235 to a frequency correction unit 236, which may include a phasing system according to the invention, over lead 237. The receiver unit 223 includes equipment for producing a train of control signals, for example, a train of start-of-mark pulses, of a frequency corresponding to the frequency of the signal elements included in the multiplex signal received by the receiver unit 223 over the electrical path 215. The train of control signals is applied over lead 238 to the frequency correction unit 236. Timing signals produced by the receiver timing unit 234 are also applied to the frequency correction unit 236 over a lead 239. The frequency correction unit 236 compares the frequency of the control signals received over lead 238 with the frequency of the timing signals received over lead 239. If the control signals are early compared to the timing signals, the frequency of the signal energy applied from the frequency correction unit 236 to the receiver timing unit 234 over lead 240 is adjusted so that the timing signals produced by the operation of the receiver timing unit 234 are advanced. If the control signals are late, the timing signals are retarded. The manner in which the phasing system of the invention is operated to perform these functions has been described in detail above. Timing signals of the proper frequency and in a given order are applied from the receiver timing unit 234 to the receiver control unit 229 over leads represented by lead 241 and to the receiver unit 223 over leads represented by lead 242. Interconnections represented by lead 243 are completed between the receiver control unit 229 and the frequency correction unit 236. Timing signals produced by the operation of the receiver control unit 229 are applied over lead 243 to the frequency correction unit 236, while timing signals produced by the operation of the frequency correction unit 236 are applied over lead 243 to the receiver control unit 229. The receiver unit 223 and the receiver control unit 229 are operated in the proper time sequence in response to the timing signals applied thereto to perform the functions outlined above.

While the above description has been directed to the equipment used to complete the transmission of code characters from the first station 1 to the second station 2, the description applies equally well, with one exception, to the equipment used to complete the transmission of code characters from the second station 2 to the first station 1. For ease of description, the corresponding equipment used to complete the transmission of message signals between the two stations 1 and 2 in the different directions has been identified by the same reference numerals, the reference numerals identifying the equipment used to complete the transmission of message signals from station 2 to station 1 being hyphenated. Code characters produced by the operation of the telegraph transmitters 217′, 219′ are transmitted over the response channels A′, B′, to the transmitter unit 218′. The five-unit code characters are converted into seven-unit code characters by the transmitter control unit 220′. The converted code characters are then transmitted by the operation of the transmitter unit 218′ in multiplex fashion over the electrical path 216, the transmitter unit 218′ including equipment for storing on a continuous basis the last three code characters transmitted over channel A′ and the last three code characters transmitted over channel B′. The multiplex signal is received by the receiver unit 223′ and the seven-unit code characters converted into five-unit code characters by the receiver control unit 229′. The converted code characters are then distributed in the proper manner over the channels A′, B′ to the telegraph printers 232′, 233′, respectively.

Up to this point, it has been assumed that the code characters in the respective multiplex signals transmitted over the electrical paths 215, 216 are received by the receiver units 223, 223′, respectively, without distortion. If one of the code characters transmitted over channel A and received by the receiver unit 223 at the second station 2 is detected by the receiver control unit 229 as a distorted character (a code character including more or less than three marking elements), a control signal is applied from the receiver control unit 229 to the receiver unit 223 over lead 231. The receiver unit 223 goes into cycling in response to the control signal, halting the further distribution of the code characters transmitted over channel A to the telegraph printer 232. At the same time a control signal is applied from the receiver unit 223 to the transmitter unit 218′ over lead 244. The transmitter unit 218′ interrupts the transmission of the code characters transmitted over channel A′ by the operation of the telegraph transmitter 217′ and proceeds to transmit a repetition request signal plus the last three code characters transmitted over channel A′ and stored by equipment in the transmitter unit 218′.

The repetition request signal is detected by the receiver control unit 229′, and a control signal is applied from the receiver control unit 229′ to the receiver unit 223′ over lead 231′. The receiver unit 223′ goes into cycling and prevents the distribution of the repeated code characters transmitted over channel A′ to the telegraph printer 232′. At the same time a control signal is applied from the receiver unit 223′ to the transmitter unit 218 over lead 245. The transmitter unit 218 operates in response to the control signal to interrupt the transmission of the code characters produced by the telegraph transmitter 217 for transmission over channel A. The transmitter unit 218 proceeds to transmit the last three code characters transmitted over channel A which were stored by equipment in the transmitter unit 218. If the code character previously received distorted is now received correctly by the receiver unit 223, the receiver unit 223 goes out of cycling. The communication system resumes its normal condition of operation in which code characters are transmitted from the telegraph transmitter 217 to the telegraph printer 232 over channel A and in which code characters are transmitted from the telegraph transmitter 217′ to the telegraph printer 232′ over channel A′. If, however, the code character is again received distorted, the above sequence of operations will continue until the code character is received correctly by the receiver unit 223.

The correction of the code character received distorted by the receiver unit 223 over channel A does not affect the transmission of the code characters from the telegraph transmitter 219 to the telegraph printer 233 over channel B and from the telegraph transmitter 219′ to the telegraph printer 233′ over channel B′. The transmission of the code characters over channels B, B′ proceeds in the normal manner. If a code character transmitted over channel B should be received distorted by the receiver unit 223, the receiver unit 223 goes into cycling. The distorted code character is not distributed to the telegraph printer 233, and a control signal is applied from the receiver unit 223 to the transmitter unit 218′ over lead 246. The transmitter unit 218′ interrupts the transmission of the code characters transmitted over channel B′ by the telegraph transmitter 219′ and proceeds to transmit over channel B′ a repetition request signal plus the last three code characters transmitted over channel B′, which were stored by equipment in the transmitter unit 218′. The receiver unit 223′ prevents the distribution of the repeated code characters to the telegraph printer 233′, and a control signal is applied from the receiver unit 223′ to the transmitter unit 218 over lead 247. The transmitter unit 218 interrupts the transmission of the code characters transmitted over channel B by the telegraph transmitter 219 and proceeds to repeat the transmission of the last three code characters transmitted over channel B. When the code character previously received distorted is received correctly, the normal transmission of code characters from the telegraph transmitter 219 to the telegraph printer 233 over channel B and from the telegraph transmitter 219′ to the telegraph printer 233′ over channel B′ resumes. The correction of the code character transmitted over channel B and received distorted by the receiver unit 223 does not affect either the transmission of code characters from the telegraph transmitter 217 to the telegraph printer 232 over channel A or the transmission of the code characters from the telegraph transmitter 217′ to the telegraph printer 232′ over channel A′. The correction of a code character received distorted over one of the channels A or B proceeds independently of the correction of a code character received distorted over the other channel. The correction of a code character received distorted over channel A and of a code character received distorted over channel B may proceed at the same time following the circuit operations outlined above.

The operation of the communication system in the reverse direction to correct code characters received distorted by the receiver unit 223′ over channels A′ or B′ is exactly the same as when code characters are received distorted by the receiver unit 223 over channels A or B. If a code character is received distorted over channel A′ or B′, the transmitter unit 218′ is operated to repeat the code character until it is correctly received by the receiver unit 223′.

An automatic error correction system of the type described requires that one station in the system be the master, while a second station in the system be the slave. As shown in Fig. 5, the first station 1 is the master station in that the transmitter timing unit 224 is operated in response to signal energy applied thereto from the frequency standard unit 225 over lead 226. The second station 2 is the slave station in that the transmitter timing unit 224′ is operated in response to signal energy applied thereto from the receiving timing unit 234 over lead 248. The stations 1, 2 in the automatic error correction system must be arranged for synchronous operation to ensure the proper operation of the correction loops. If the transmitting timing units 224, 224′ were both operated in response to signal energy applied thereto from a frequency standard unit, a phase difference would exist which would vary by the amount that the two frequency standard units differed in frequency. By applying the signal energy from the receiving timing unit 234 to the transmitter timing unit 224′, the operation of the receiver timing unit 234 being controlled by the frequency correction unit 236, a synchronously operated system is provided.

A phasing system is disclosed by the invention which is both accurate and dependable in operation, and is readily adaptable for use in systems, for example, of the type described in connection with Fig. 5.

What is claimed is:

1. An electronic circuit arrangement for synchronizing a timing wave produced by a timing wave generator with a train of pulses derived from an incoming signal comprising, in combination, an input circuit to which said train of pulses is applied, a phase adjusting circuit, a timing wave generator, means for supplying a reference wave to said generator over an electrical path including said phase adjusting circuit, said generator being responsive to said reference wave to simultaneously produce a pair of timing waves of opposite relative phase having a frequency corresponding to that of said incoming signal, a phase detector circuit coupled to said input circuit, means for applying said pair of timing waves to said phase detector circuit, said phase detector circuit being arranged to produce a first output pulse when the amplitude of one of the timing waves plus that of a pulse included in said train applied thereto exceeds that of said timing wave alone and to produce a second output pulse when the amplitude of the other timing wave plus that of a pulse included in said train applied thereto exceeds that of said other timing wave alone, first and second circuits each having two stable states coupled to said phase detector circuit and normally operated in corresponding first stable states, said first circuit being arranged to assume its second stable state upon the production by said phase detector circuit of a predetermined number of said first output pulses, control means connected between said first circuit and said phase adjusting circuit and responsive each time said first circuit is made to assume its second stable state for applying a control pulse to said phase adjusting circuit, said phase adjusting circuit being responsive to said control pulse to shift the phase of said reference wave so as to bring said timing waves into synchronization with said train of pulses, said second circuit being arranged to assume its second stable state upon the production by said phase detector circuit of said predetermined number of said second output pulses, and interconnections completed between said control means and said first and second circuits arranged to prevent the application of said control pulse by said control means to said phase adjusting circuit when both of said first and second circuits are in their respective second stable states at the same time.

2. An electronic circuit arrangement for synchronizing a timing wave produced by a timing wave generator with a train of pulses derived from an incoming signal comprising, in combination, an input circuit to which said train of pulses is applied, a phase adjusting circuit, a timing wave generator, means for supplying a reference wave to said generator over an electrical path including said phase adjusting circuit, said generator being responsive to said reference wave to produce a pair of timing waves of opposite relative phase having a frequency corresponding to that of said incoming signal, a phase detector circuit coupled to said input circuit, means for applying said pair of timing waves to said phase detector circuit, said phase detector circuit being arranged to produce a first output pulse when the amplitude of one of the timing waves plus that of a pulse included in said train applied thereto exceeds that of said one timing wave alone and to produce a second output pulse when the amplitude of the other timing wave plus that of a pulse included in said train applied thereto exceeds that of said other timing wave alone, first and second circuits each having two stable states coupled to said phase detector circuit and normally operated in corresponding first stable states, said first circuit being arranged to assume its second stable state upon the production by said phase detector circuit of a predetermined number of said first output pulses, a first control means connected between said first circuit and said phase adjusting circuit and responsive to the operation of said first circuit in its second stable state to apply a first control pulse to said phase adjusting circuit, said phase adjusting circuit being responsive to said first control pulse to advance said reference wave in phase so as to bring said timing waves into synchronization with said train of pulses, said second circuit being arranged to assume its second stable state upon the production by said phase detector circuit of said predetermined number of said second output pulses, a second control means connected between said second circuit and said phase adjusting circuit and responsive to the operation of said second circuit in its second stable state to apply a second control pulse to said phase adjusting circuit, said phase adjusting circuit being responsive to said second control pulse to retard said reference wave in phase so as to bring said timing waves into synchronization with said train of pulses, and interconnections completed between said first and second control means and said first and second circuits arranged to prevent the application of either said first or said second control pulse to said phase adjusting circuit when both of said first and second circuits are in their respective second stable states at the same time.

3. An electronic circuit arrangement as claimed in claim 2 and wherein said phase detector circuit includes first and second electron discharge devices to which pair of timing waves are individually applied, each of said discharge devices being coupled to said input circuit, said first discharge device being arranged to produce said first output pulse each time that the amplitude of the timing wave plus that of a pulse included in said train applied thereto exceeds that of the timing wave alone, said second discharge device being arranged to produce said second output pulse each time that the amplitude of the timing wave plus that of a pulse included in said train applied thereto exceeds that of the timing wave alone.

4. An electronic circuit arrangement as claimed in claim 2 and wherein first and second binary counting chains are individually connected between said first and second circuits and said phase detector circuit, said first chain being responsive to said predetermined number of said first output pulses to apply a trigger pulse to said first circuit so as to cause said first circuit to assume its second stable state, said second chain being responsive to said predetermined number of said second output pulses to apply a trigger pulse to said second circuit to cause said second circuit to assume its second stable state.

5. An electronic circuit arrangement for synchronizing a timing wave produced by a timing wave generator with a train of pulses derived from an on-off incoming signal, the pulses included in said train each occurring at off-on transitions of said signal, comprising, in combination, an input circuit to which said train of pulses is applied, a phase adjusting circuit, a timing wave generator, means for supplying a reference wave to said generator over an electrical path including said phase adjusting circuit, said generator being responsive to said reference wave to produce a pair of timing waves of opposite relative phase having a frequency corresponding to that of said incoming signal and to produce a train of inspection pulses occurring at regular intervals, a phase detector circuit coupled to said input circuit, means for applying said pair of timing waves to said phase detector circuit, said phase detector circuit being arranged to produce a first output pulse when the amplitude of one of the timing waves plus that of a pulse included in said train applied thereto exceeds that of said one timing wave alone and to produce a second output pulse when the amplitude of the other timing wave plus that of a pulse included in said train applied thereto exceeds that of said other timing wave alone, first and second circuits each having two stable states coupled to said phase detector circuit and normally operated in corresponding first stable states, said first circuit being arranged to assume its second stable state upon the production by said phase detector circuit of a predetermined number of said first output pulses, a gating device connected between said first circuit and said phase adjusting circuit, means for applying said train of inspection pulses from said generator to said gating device, said gating device being responsive to the operation of said first circuit in its second stable state and to the reception of one of said inspection pulses to apply a control pulse to said phase adjusting circuit to cause said phase adjusting circuit to shift the phase of said reference wave so as to bring said timing waves into synchronization with said train of pulses, said second circuit being arranged to assume its second stable state upon the production by said phase detector circuit of said predetermined number of said second output pulses, and interconnections completed between said gating device and said first and second circuits to prevent the application of said control pulse by said gating device to said phase adjusting circuit when both of said first and second circuits are in their respective second stable states at the same time.

6. An electronic circuit arrangement for synchronizing a timing wave produced by a timing wave generator with a train of pulses derived from an on-off incoming signal, the pulses included in said train each occurring at off-on transitions of said signal comprising, in combination, an input circuit to which said train of pulses is applied, a phase adjusting circuit, a timing wave generator, means for supplying a reference wave to said generator over an electrical path including said phase adjusting circuit, said generator being responsive to said reference wave to produce a pair of timing waves of opposite relative phase having a frequency corresponding to that of said incoming signal and to produce a train of inspection pulses occurring at regular intervals, a phase detector circuit coupled to said input circuit, means for applying said pair of timing waves to said phase detector circuit, said phase detector circuit being arranged to produce a first output pulse when the amplitude of one of the timing waves plus that of a pulse included in said train applied thereto exceeds that of said one timing wave alone and to produce a second output pulse when the amplitude of the other timing wave plus that of a pulse included in said train applied thereto exceeds that of said other timing wave alone, first and second circuits each having two stable states coupled to said phase detector circuit and normally operated in corresponding first stable states, said first circuit being arranged to assume its second stable state upon the production by said phase detector circuit of a predetermined number of said first output pulses, said second circuit being arranged to assume its second stable state upon the production by said phase detector circuit of said predetermined number of said second output pulses, first and second gating devices individually connected between said first and second circuits and said phase adjusting circuit, means for applying said train of inspection pulses from said generator to both of said gating devices, said first gating device being responsive to the operation of said first circuit in its second stable state and to the reception of one of said inspection pulses to apply a first control pulse to said phase adjusting circuit to cause said phase adjusting circuit to advance said reference wave in phase so as to bring said timing waves into synchronization with said train of pulses, said second gating device being responsive to the operation of said second circuit in its second stable state and to the reception of one of said inspection pulses to apply a second control pulse to said phase adjusting circuit to cause said phase adjusting circuit to retard said reference wave in phase so as to bring said timing waves into synchronization with said train of pulses, and interconnections completed between said gating devices and said first and second circuits arranged to prevent the application of either said first or said second control pulse to said phase adjusting circuit when both of said first and second circuits are in their respective second stable states at the same time.

7. An electronic circuit as claimed in claim 6 and wherein first and second binary counting chains are individually connected between said first and second circuits and said phase detector circuit, said first chain being responsive to said predetermined number of said first output pulses to apply a trigger pulse to said first circuit so as to cause said first circuit to assume its second stable state, said second chain being responsive to said predetermined number of said second output pulses to apply a trigger pulse to said second circuit to cause said second circuit to assume its second stable state.

8. An electronic circuit as claimed in claim 6 and wherein said generator is responsive to said reference wave to produce a reset pulse immediately following each of said inspection pulses produced thereby, means for applying said reset pulses to both of said first and second circuits, said first and second circuits each being responsive to the reception of one of said reset pulses to assume its said first stable state.

9. An electronic circuit arrangement for synchronizing a timing wave produced by a timing wave generator with a train of pulses derived from an incoming signal comprising, in combination, an input circuit to which said train of pulses is applied, a phase adjusting circuit, a timing wave generator, means for supplying a reference wave to said generator over an electrical path including said phase adjusting circuit, said generator being responsive to said reference wave to produce a pair of timing waves of opposite relative phase having a frequency corresponding to that of said incoming signal, first and second gating devices coupled to said input circuit, means for applying said pair of timing waves individually to said gating devices, said gating devices each being arranged to produce an output pulse when the amplitude of the timing wave plus that of a pulse included in said train applied thereto exceeds the amplitude of the timing wave alone, first and second circuits each having two stable states individually coupled to said gating devices and normally operated in corresponding first stable states, said first circuit being arranged to assume its second stable state upon the production by said first gating device of a predetermined number of output pulses, control means connected between said first circuit and said phase adjusting circuit and responsive to the operation of said first circuit in its second stable state to apply a control pulse to said phase adjusting circuit, said phase adjusting circuit being responsive to said control pulse to shift the phase of said reference wave so as to bring said timing waves into synchronization with said train of pulses, said second circuit being arranged to assume its second stable state upon the production by said second gating device of said predetermined number of output pulses, and interconnections completed between said control means and said first and second circuits arranged to prevent the application of said control pulse by said control means to said phase adjusting circuit when both of said first and second circuits are in their respective second stable states at the same time.

10. An electronic circuit arrangement for synchronizing a timing wave produced by a timing wave generator with a train of pulses derived from an incoming signal comprising, in combination, an input circuit to which said train of pulses is applied, a phase adjusting circuit, a timing wave generator, means for supplying a reference wave to said generator over an electrical path including said phase adjusting circuit, said generator being responsive to said reference wave to produce a pair of timing waves of opposite relative phase having a frequency corresponding to that of said incoming signal, first and second gating devices coupled to said input circuit, means for applying said pair of timing waves individually to said gating devices, said gating devices each being arranged to produce an output pulse when the amplitude of the timing wave plus that of a pulse included in said train applied thereto exceeds the amplitude of the timing wave alone, first and second circuits each having two stable states individually coupled to said gating devices and normally operated in corresponding first stable states, said first circuit being arranged to assume its second stable state upon the production by said first gating device of a predetermined number of output pulses, a first control means connected between said first circuit and said phase adjusting circuit and responsive to the operation of said first circuit in its second stable state to apply a first control pulse to said phase adjusting circuit, said phase adjusting circuit being responsive to said first control pulse to advance said reference wave in phase so as to bring said timing waves into synchronization with said train of pulses, said second circuit being arranged to assume its second stable state upon the production by said second gating device of said predetermined number of output pulses, a second control means connected between said second circuit and said phase adjusting circuit and responsive to the operation of said second circuit in its second stable state to apply a second control pulse to said phase adjusting circuit, said phase adjusting circuit being responsive to said second control pulse to retard said reference wave in phase so as to bring said timing waves into synchronization with said train of pulses, and interconnections completed between said first and second control means and said first and second circuits to prevent the application of either said first or said second control pulse to said phase adjusting circuit when both of said first and second circuits are in their respective second stable states at the same time.

11. An electronic circuit arrangement for synchronizing a timing wave produced by a timing wave generator with a train of pulses derived from an incoming signal comprising, in combination, an input circuit to which said train of pulses is applied, a phase adjusting circuit, a timing wave generator, means for supplying a reference wave to said generator over an electrical path including said phase adjusting circuit, said generator being responsive to said reference wave to produce a pair of timing waves of opposite relative phase having a frequency corresponding to that of said incoming signal and to produce a train of inspection pulses occurring at regular intervals, first and second gating devices coupled to said input circuit, means for applying said pair of timing waves individually to said gating devices, said gating devices each being arranged to produce an output pulse when the amplitude of the timing wave plus that of a pulse included in said train applied thereto exceeds the amplitude of the timing wave alone, first and second circuits each having two stable states and normally operated in corresponding first stable states, means to couple said first circuit to said first gating device and means to couple said second circuit to said second gating device said first circuit being arranged to assume its second stable state upon the production by said first gating device of a predetermined number of output pulses, said second circuit being arranged to assume its second stable state upon the production by said second gating device of said predetermined number of output pulses, third and fourth gating devices individually connected between said first and second circuits and said phase adjusting circuit, means for applying said train of inspection pulses from said generator to both of said third and fourth gating devices, said third gating device being responsive to the operation of said first circuit in its second stable state and to the reception of one of said inspection pulses to apply a first control pulse to said phase adjusting circuit to cause said phase adjusting circuit to advance said reference wave in phase so as to bring said timing waves into synchronization with said train of pulses, said fourth gating device being responsive to the operation of said second circuit in its second stable state and to the reception of one of said inspection pulses to apply a second control pulse to said phase adjusting circuit to cause said phase adjusting circuit to retard said reference wave in phase so as to bring said timing waves into synchronization with said train of pulses, and interconnections completed between said third and fourth gating devices and said first and second circuits to prevent the application of either said first or second control pulse to said phase adjusting circuit when both of said first and second circuits are in their respective second stable states at the same time.

12. An electronic circuit arrangement as claimed in claim 11 and wherein said generator is responsive to said reference wave to produce a reset pulse immediately following each of said inspection pulses produced thereby, means for applying said reset pulses from said generator to both of said first and second circuits, said first and second circuits each being responsive to one of said reset pulses to assume its first stable state.

References Cited in the file of this patent

UNITED STATES PATENTS

| | | |
|---|---|---|
| 2,529,666 | Sands | Nov. 14, 1950 |
| 2,536,228 | Ruysdael et al. | Jan. 2, 1951 |
| 2,677,758 | Robinson et al. | May 4, 1954 |
| 2,716,158 | Shenk et al. | Aug. 23, 1955 |
| 2,717,999 | Lewinstein | Sept. 13, 1955 |
| 2,760,189 | McCoy et al. | Aug. 21, 1956 |
| 2,769,857 | Liguori | Nov. 6, 1956 |

UNITED STATES PATENT OFFICE

CERTIFICATE OF CORRECTION

Patent No. 2,923,820 February 2, 1960

Anthony Liguori et al.

It is hereby certified that error appears in the printed specification of the above numbered patent requiring correction and that the said Letters Patent should read as corrected below.

Column 24, line 16, after "which" insert -- said --.

Signed and sealed this 23rd day of August 1960.

(SEAL)
Attest:

KARL H. AXLINE
Attesting Officer

ROBERT C. WATSON
Commissioner of Patents